(12) United States Patent
Curtis-Maury et al.

(10) Patent No.: US 11,994,998 B2
(45) Date of Patent: May 28, 2024

(54) LOW-OVERHEAD ATOMIC WRITES FOR PERSISTENT MEMORY

(71) Applicant: NetApp Inc., San Jose, CA (US)

(72) Inventors: Matthew Fontaine Curtis-Maury, Apex, NC (US); Vinay Devadas, Apex, NC (US); Ananthan Subramanian, San Ramon, CA (US); Ram Kesavan, Los Altos, CA (US)

(73) Assignee: NetApp, Inc., San Jose, CA (US)

( * ) Notice: Subject to any disclaimer, the term of this patent is extended or adjusted under 35 U.S.C. 154(b) by 46 days.

(21) Appl. No.: 17/750,707

(22) Filed: May 23, 2022

(65) Prior Publication Data

US 2022/0300429 A1 Sep. 22, 2022

Related U.S. Application Data

(63) Continuation of application No. 16/852,589, filed on Apr. 20, 2020, now Pat. No. 11,341,056.

(51) Int. Cl.
| | |
|---|---|
| *G06F 12/0882* | (2016.01) |
| *G06F 12/02* | (2006.01) |
| *G06F 12/0871* | (2016.01) |
| *G06F 16/182* | (2019.01) |
| *G06F 16/22* | (2019.01) |

(52) U.S. Cl.
CPC ...... *G06F 12/0882* (2013.01); *G06F 12/0246* (2013.01); *G06F 12/0871* (2013.01); *G06F 16/182* (2019.01); *G06F 16/2246* (2019.01)

(58) Field of Classification Search
CPC ............. G06F 12/0882; G06F 12/0246; G06F 12/0871; G06F 16/182; G06F 16/2246
See application file for complete search history.

(56) References Cited

U.S. PATENT DOCUMENTS

| | | |
|---|---|---|
| 11,341,056 B2 | 5/2022 | Curtis-Maury et al. |
| 2018/0267706 A1* | 9/2018 | Li .......................... G06F 3/061 |
| 2018/0356991 A1 | 12/2018 | Oukid et al. |
| 2019/0188091 A1* | 6/2019 | Christiansen ....... G06F 16/2379 |
| 2021/0081388 A1* | 3/2021 | Ding ................... G06F 16/1734 |

* cited by examiner

*Primary Examiner* — Edward J Dudek, Jr.
(74) *Attorney, Agent, or Firm* — Cooper Legal Group, LLC

(57) ABSTRACT

Techniques are provided for atomic writes for persistent memory. In response to receiving a write operation, a new per-page structure with a new page block number is allocated. New data of the write operation is persisted to a new page of the persistent memory having the new page block number, and the new per-page structure is persisted to the persistent memory. If the write operation targets a hole after the new data and the new per-page structure have been persisted, then a new per-page structure identifier of the new per-page structure is inserted into a parent indirect page of a page comprising the new data. If the write operation targets old data after the new data and the new per-page structure have been persisted, then an old per-page structure of the old data is updated with the new page block number.

31 Claims, 12 Drawing Sheets

LOW-OVERHEAD ATOMIC WRITES FOR PERSISTENT MEMORY

RELATED APPLICATION

This application claims priority to and is a continuation of U.S. patent application Ser. No. 16/852,589, titled "LOW-OVERHEAD ATOMIC WRITES FOR PERSISTENT MEMORY" and filed on Apr. 20, 2020, which is incorporated herein by reference.

BACKGROUND

A node, such as a server, a computing device, a virtual machine, etc., may host a storage operating system. The storage operating system may be configured to store data on behalf of client devices, such as within volumes, aggregates, storage devices, cloud storage, locally attached storage, etc. In this way, a client can issue a read operation or a write operation to the storage operating system of the node in order to read data from storage or write data to the storage. The storage operating system may implement a file system through which the data is organized and accessible to the client devices.

The node may comprise persistent memory into which user data is stored and organized by the file system. The file system may write user data into the persistent memory in place. That is, if a write operation is to overwrite current data within the persistent memory, then the new data of the write operation will overwrite the current data at a current location of the current data within the persistent memory. Unfortunately, if a crash occurs during the execution of the write operation, then the persistent memory may comprise all new data, all old data, or some new data and some old data. This is because the persistent memory may merely support 8 byte atomic writes, such that merely 8 bytes of a write operation can be guaranteed as either being fully written to with new data or still comprising all old data, but not a mixture of some old data and some new data if there is a crash. However, the new data of the write operation may be much larger than 8 bytes, such as 4 kb, 64 kb, or any other size. Thus, a substantial portion of the write operation may not be atomically written to the persistent storage in the event of a crash. Once the node recovers from the crash, the persistent memory will be in an inconsistent state that cannot be reconstructed into a known valid state, and thus data corruption and other issues will result.

DETAILED DESCRIPTION

Figure 1:
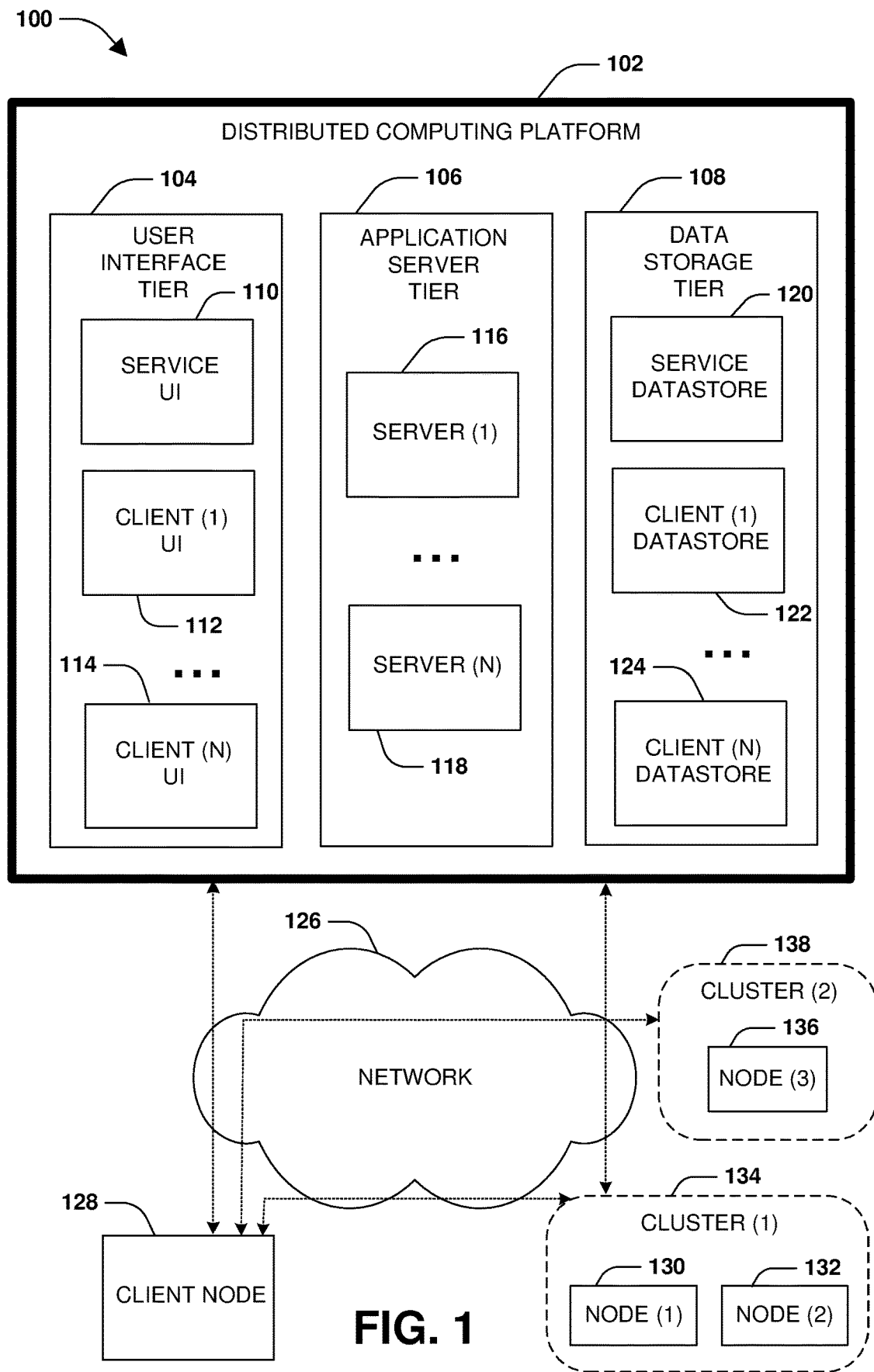
FIG. 1 is a block diagram illustrating an example computing environment in which an embodiment of the invention may be implemented.

Some examples of the claimed subject matter are now described with reference to the drawings, where like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. Nothing in this detailed description is admitted as prior art.

A node may be implemented as a computing device, a server, an on-premise device, a virtual machine, hardware, software, or combination thereof. The node may be configured to manage storage on behalf of client devices using various types of storage, such as hard disk drives, solid state drives, cloud storage, memory, persistent memory, or other types of storage within which client data may be stored through volumes, aggregates, cloud storage objects, etc. The node may manage this storage utilizing a storage operating system and a file system for organizing and managing the client data. In an embodiment, the file system may be tailored for a certain type of storage, such as having APIs, data structures, and functionality capable of accessing and storing data within byte-addressable storage such as persistent memory. In this way, a client device can connect to the node in order to access the client data through the file system, such as data stored in the persistent memory.

The node may utilize the persistent memory to improve performance and processing of client I/O because persistent memory provides relatively lower latency and faster access speeds compared to other storage, such as disk drives, solid state drives, and cloud storage. The persistent memory is byte-addressable and provides similar access characteristics and semantics as memory, such as dynamic random-access memory (DRAM). Write operations to the persistent memory may generally be performed in place. In particular, if a write operation is to overwrite data within the persistent memory, then new data of the write operation will overwrite the data at a current location of the data within the persistent memory. If the node crashes during execution of the write operation, then a single page of storage within the persistent memory could comprise some of the new data and some of the old data at any multiple of an atomic write size provided by the persistent memory, such as 8 bytes. That is, the persistent memory may provide an atomic write size such as 8 bytes, such that the persistent memory will guarantee that a write to 8 bytes will either complete successfully to write all of the new data or fail completely leaving only the old data. However, the write operation may write much more data than 8 bytes to the persistent memory, such as 4 kb, 64 kb, etc. Thus, if a crash occurs during the execution of the write operation, then the persistent memory may comprise some new data and some old data, which can cause data corruption and other issues. Thus, client requirements for crash consistency cannot be met because after recovering from the failure, the persistent memory may not have solely the old data or solely the new data.

A copy on write operation could be performed instead of writing the new data in place. In particular, the copy on write operation will write the new data to a different location within the persistent memory than a current location of the old data within the persistent memory. Thus, if the node crashes during the copy on write operation, the old data will still be intact within the persistent memory. However, copy on write operations present various complexities. One issue is that parent indirect pages that point to a location of the old data must be updated to point to a location of the new data. For example, a parent indirect page within a file tree of a file may comprise a reference to a physical location of the old data that must be updated to reference the new location of the new data. There may be a substantial number of parent indirect pages that must be updated, which introduces complexity and overhead. Furthermore, checksums of parent indirect pages must be updated to replace old checksums of the old data with new checksums of the new data. That is, when a page block number in a parent indirect page has been updated, then the parent indirect page has changed and its checksum must be updated.

Another issue is where the file system of the persistent memory is maintained as a higher tier within a storage operating system storage stack than a storage file system implemented for other storage (e.g., a storage file system for hard disk drives, solid state drives, cloud storage, or block-addressable storage). That is, the storage file system within the lower tier may have been informed of locations of data within the persistent memory, such as where page block numbers of pages of data within the persistent memory are provided to the storage file system. However, the copy on write operation will invalidate the lower tier's knowledge of where data is located within the persistent memory because the lower tier will have references to the old page block numbers of the old data instead of the new page block numbers of the new data. Thus, a resynchronization must be performed, which introduces additional overhead and resource consumption.

Accordingly, as provided herein, low overhead atomic writes are provided for the persistent memory. In particular, an indirection layer is implemented between references to pages within the persistent memory (e.g., references from a parent indirect page to a child page within which data is stored, references maintained by a lower storage tier to the data within the persistent memory, etc.) and the actual address of the pages (page block numbers). The indirection layer utilizes per-page structures for redirection to the pages comprising the actual data. File system references to a page (e.g., a reference within a parent indirect page to a child page within a file tree of a file) will no longer point directly to a physical location of the page, but will instead point to a per-page structure that itself will point to the physical location of the page, such as by using a page block number of the page. For example, a parent indirect page that is a parent of a page within the persistent memory will comprise a per-page structure identifier of a per-page structure for the page instead of a page block number of the page. The per-page structure identifier within the parent indirect page can be used to access the per-page structure that will comprise the page block number of the page.

When a write operation is to write new data to persistent memory, the new data is written to a new location that is different than a location of the old data being overwritten by the write operation. Instead of having to update all references to now point to the new location at which the new data is stored within the persistent memory (e.g., references within parent indirect pages, references stored within the lower tier, etc.), a per-page structure for the old data is updated with a new page block number of the new data. In this way, merely a single update to the per-page structure of the indirection layer is updated instead of having to locate and update all of the references.

FIG. 1 is a diagram illustrating an example operating environment 100 in which an embodiment of the techniques described herein may be implemented. In one example, the techniques described herein may be implemented within a client device 128, such as a laptop, a tablet, a personal computer, a mobile device, a server, a virtual machine, a wearable device, etc. In another example, the techniques described herein may be implemented within one or more nodes, such as a first node 130 and/or a second node 132 within a first cluster 134, a third node 136 within a second cluster 138, etc. A node may comprise a storage controller, a server, an on-premise device, a virtual machine such as a storage virtual machine, hardware, software, or combination thereof. The one or more nodes may be configured to manage the storage and access to data on behalf of the client device 128 and/or other client devices. In another example, the techniques described herein may be implemented within a distributed computing platform 102 such as a cloud computing environment (e.g., a cloud storage environment, a multi-tenant platform, a hyperscale infrastructure comprising scalable server architectures and virtual networking, etc.) configured to manage the storage and access to data on behalf of client devices and/or nodes.

In yet another example, at least some of the techniques described herein are implemented across one or more of the client device 128, the one or more nodes 130, 132, and/or 136, and/or the distributed computing platform 102. For example, the client device 128 may transmit operations, such as data operations to read data and write data and metadata operations (e.g., a create file operation, a rename directory operation, a resize operation, a set attribute operation, etc.), over a network 126 to the first node 130 for implementation by the first node 130 upon storage. The first node 130 may store data associated with the operations within volumes or other data objects/structures hosted within locally attached storage, remote storage hosted by other computing devices accessible over the network 126, storage provided by the distributed computing platform 102, etc. The first node 130 may replicate the data and/or the operations to other computing devices, such as to the second node 132, the third node 136, a storage virtual machine executing within the distributed computing platform 102, etc., so that one or more replicas of the data are maintained. For example, the third node 136 may host a destination storage volume that is maintained as a replica of a source storage volume of the first node 130. Such replicas can be used for disaster recovery and failover.

In an embodiment, the techniques described herein are implemented by a storage operating system or are implemented by a separate module that interacts with the storage operating system. The storage operating system may be hosted by the client device, 128, a node, the distributed computing platform 102, or across a combination thereof. In an example, the storage operating system may execute within a storage virtual machine, a hyperscaler, or other computing environment. The storage operating system may implement a storage file system to logically organize data within storage devices as one or more storage objects and provide a logical/virtual representation of how the storage objects are organized on the storage devices. A storage object may comprise any logically definable storage element stored by the storage operating system (e.g., a volume stored by the first node 130, a cloud object stored by the distributed computing platform 102, etc.). Each storage object may be associated with a unique identifier that uniquely identifies the storage object. For example, a volume may be associated with a volume identifier uniquely identifying that volume from other volumes. The storage operating system also manages client access to the storage objects.

The storage operating system may implement a file system for logically organizing data. For example, the storage operating system may implement a write anywhere file layout for a volume where modified data for a file may be written to any available location as opposed to a write-in-place architecture where modified data is written to the original location, thereby overwriting the previous data. In an example, the file system may be implemented through a file system layer that stores data of the storage objects in an on-disk format representation that is block-based (e.g., data is stored within 4 kilobyte blocks and inodes are used to identify files and file attributes such as creation time, access permissions, size and block location, etc.).

In an example, deduplication may be implemented by a deduplication module associated with the storage operating system. Deduplication is performed to improve storage efficiency. One type of deduplication is inline deduplication that ensures blocks are deduplicated before being written to a storage device. Inline deduplication uses a data structure, such as an incore hash store, which maps fingerprints of data to data blocks of the storage device storing the data. Whenever data is to be written to the storage device, a fingerprint of that data is calculated and the data structure is looked up using the fingerprint to find duplicates (e.g., potentially duplicate data already stored within the storage device). If duplicate data is found, then the duplicate data is loaded from the storage device and a byte by byte comparison may be performed to ensure that the duplicate data is an actual duplicate of the data to be written to the storage device. If the data to be written is a duplicate of the loaded duplicate data, then the data to be written to disk is not redundantly stored to the storage device. Instead, a pointer or other reference is stored in the storage device in place of the data to be written to the storage device. The pointer points to the duplicate data already stored in the storage device. A reference count for the data may be incremented to indicate that the pointer now references the data. If at some point the pointer no longer references the data (e.g., the deduplicated data is deleted and thus no longer references the data in the storage device), then the reference count is decremented. In this way, inline deduplication is able to deduplicate data before the data is written to disk. This improves the storage efficiency of the storage device.

Background deduplication is another type of deduplication that deduplicates data already written to a storage device. Various types of background deduplication may be implemented. In an example of background deduplication, data blocks that are duplicated between files are rearranged within storage units such that one copy of the data occupies physical storage. References to the single copy can be inserted into a file system structure such that all files or containers that contain the data refer to the same instance of the data. Deduplication can be performed on a data storage device block basis. In an example, data blocks on a storage device can be identified using a physical volume block number. The physical volume block number uniquely identifies a particular block on the storage device. Additionally, blocks within a file can be identified by a file block number. The file block number is a logical block number that indicates the logical position of a block within a file relative to other blocks in the file. For example, file block number 0 represents the first block of a file, file block number 1 represents the second block, etc. File block numbers can be mapped to a physical volume block number that is the actual data block on the storage device. During deduplication operations, blocks in a file that contain the same data are deduplicated by mapping the file block number for the block to the same physical volume block number, and maintaining a reference count of the number of file block numbers that map to the physical volume block number. For example, assume that file block number 0 and file block number 5 of a file contain the same data, while file block numbers 1-4 contain unique data. File block numbers 1-4 are mapped to different physical volume block numbers. File block number 0 and file block number 5 may be mapped to the same physical volume block number, thereby reducing storage requirements for the file. Similarly, blocks in different files that contain the same data can be mapped to the same physical volume block number. For example, if file block number 0 of file A contains the same data as file block number 3 of file B, file block number 0 of file A may be mapped to the same physical volume block number as file block number 3 of file B.

In another example of background deduplication, a changelog is utilized to track blocks that are written to the storage device. Background deduplication also maintains a fingerprint database (e.g., a flat metafile) that tracks all unique block data such as by tracking a fingerprint and other filesystem metadata associated with block data. Background deduplication can be periodically executed or triggered based upon an event such as when the changelog fills beyond a threshold. As part of background deduplication, data in both the changelog and the fingerprint database is sorted based upon fingerprints. This ensures that all duplicates are sorted next to each other. The duplicates are moved to a dup file. The unique changelog entries are moved to the fingerprint database, which will serve as duplicate data for a next deduplication operation. In order to optimize certain filesystem operations needed to deduplicate a block, duplicate records in the dup file are sorted in certain filesystem sematic order (e.g., inode number and block number). Next, the duplicate data is loaded from the storage device and a whole block byte by byte comparison is performed to make sure duplicate data is an actual duplicate of the data to be written to the storage device. After, the block in the changelog is modified to point directly to the duplicate data as opposed to redundantly storing data of the block.

In an example, deduplication operations performed by a data deduplication layer of a node can be leveraged for use on another node during data replication operations. For example, the first node 130 may perform deduplication operations to provide for storage efficiency with respect to data stored on a storage volume. The benefit of the deduplication operations performed on first node 130 can be provided to the second node 132 with respect to the data on first node 130 that is replicated to the second node 132. In some aspects, a data transfer protocol, referred to as the LRSE (Logical Replication for Storage Efficiency) protocol, can be used as part of replicating consistency group differences from the first node 130 to the second node 132. In the LRSE protocol, the second node 132 maintains a history buffer that keeps track of data blocks that it has previously received. The history buffer tracks the physical volume block numbers and file block numbers associated with the data blocks that have been transferred from first node 130 to the second node 132. A request can be made of the first node 130 to not transfer blocks that have already been transferred. Thus, the second node 132 can receive deduplicated data from the first node 130, and will not need to perform deduplication operations on the deduplicated data replicated from first node 130.

In an example, the first node 130 may preserve deduplication of data that is transmitted from first node 130 to the distributed computing platform 102. For example, the first node 130 may create an object comprising deduplicated data. The object is transmitted from the first node 130 to the distributed computing platform 102 for storage. In this way, the object within the distributed computing platform 102 maintains the data in a deduplicated state. Furthermore, deduplication may be preserved when deduplicated data is transmitted/replicated/mirrored between the client device 128, the first node 130, the distributed computing platform 102, and/or other nodes or devices.

In an example, compression may be implemented by a compression module associated with the storage operating system. The compression module may utilize various types of compression techniques to replace longer sequences of data (e.g., frequently occurring and/or redundant sequences) with shorter sequences, such as by using Huffman coding, arithmetic coding, compression dictionaries, etc. For example, an uncompressed portion of a file may comprise "ggggnnnnnnqqqqqqqqq", which is compressed to become "4g6n10q". In this way, the size of the file can be reduced to improve storage efficiency. Compression may be implemented for compression groups. A compression group may correspond to a compressed group of blocks. The compression group may be represented by virtual volume block numbers. The compression group may comprise contiguous or non-contiguous blocks.

Compression may be preserved when compressed data is transmitted/replicated/mirrored between the client device 128, a node, the distributed computing platform 102, and/or other nodes or devices. For example, an object may be created by the first node 130 to comprise compressed data. The object is transmitted from the first node 130 to the distributed computing platform 102 for storage. In this way, the object within the distributed computing platform 102 maintains the data in a compressed state.

In an example, various types of synchronization may be implemented by a synchronization module associated with the storage operating system. In an example, synchronous replication may be implemented, such as between the first node 130 and the second node 132. It may be appreciated that the synchronization module may implement synchronous replication between any devices within the operating environment 100, such as between the first node 130 of the first cluster 134 and the third node 136 of the second cluster 138 and/or between a node of a cluster and an instance of a node or virtual machine in the distributed computing platform 102.

As an example, during synchronous replication, the first node 130 may receive a write operation from the client device 128. The write operation may target a file stored within a volume managed by the first node 130. The first node 130 replicates the write operation to create a replicated write operation. The first node 130 locally implements the write operation upon the file within the volume. The first node 130 also transmits the replicated write operation to a synchronous replication target, such as the second node 132 that maintains a replica volume as a replica of the volume maintained by the first node 130. The second node 132 will execute the replicated write operation upon the replica volume so that file within the volume and the replica volume comprises the same data. After, the second node 132 will transmit a success message to the first node 130. With synchronous replication, the first node 130 does not respond with a success message to the client device 128 for the write operation until both the write operation is executed upon the volume and the first node 130 receives the success message that the second node 132 executed the replicated write operation upon the replica volume.

In another example, asynchronous replication may be implemented, such as between the first node 130 and the third node 136. It may be appreciated that the synchronization module may implement asynchronous replication between any devices within the operating environment 100, such as between the first node 130 of the first cluster 134 and the distributed computing platform 102. In an example, the first node 130 may establish an asynchronous replication relationship with the third node 136. The first node 130 may capture a baseline snapshot of a first volume as a point in time representation of the first volume. The first node 130 may utilize the baseline snapshot to perform a baseline transfer of the data within the first volume to the third node 136 in order to create a second volume within the third node 136 comprising data of the first volume as of the point in time at which the baseline snapshot was created.

After the baseline transfer, the first node 130 may subsequently create snapshots of the first volume over time. As part of asynchronous replication, an incremental transfer is performed between the first volume and the second volume. In particular, a snapshot of the first volume is created. The snapshot is compared with a prior snapshot that was previously used to perform the last asynchronous transfer (e.g., the baseline transfer or a prior incremental transfer) of data to identify a difference in data of the first volume between the snapshot and the prior snapshot (e.g., changes to the first volume since the last asynchronous transfer). Accordingly, the difference in data is incrementally transferred from the first volume to the second volume. In this way, the second volume will comprise the same data as the first volume as of the point in time when the snapshot was created for performing the incremental transfer. It may be appreciated that other types of replication may be implemented, such as semi-sync replication.

In an embodiment, the first node 130 may store data or a portion thereof within storage hosted by the distributed computing platform 102 by transmitting the data within objects to the distributed computing platform 102. In one example, the first node 130 may locally store frequently accessed data within locally attached storage. Less frequently accessed data may be transmitted to the distributed computing platform 102 for storage within a data storage tier 108. The data storage tier 108 may store data within a service data store 120, and may store client specific data within client data stores assigned to such clients such as a client (1) data store 122 used to store data of a client (1) and a client (N) data store 124 used to store data of a client (N). The data stores may be physical storage devices or may be defined as logical storage, such as a virtual volume, LUNs, or other logical organizations of data that can be defined across one or more physical storage devices. In another example, the first node 130 transmits and stores all client data to the distributed computing platform 102. In yet another example, the client device 128 transmits and stores the data directly to the distributed computing platform 102 without the use of the first node 130.

The management of storage and access to data can be performed by one or more storage virtual machines (SVMs) or other storage applications that provide software as a service (SaaS) such as storage software services. In one example, an SVM may be hosted within the client device 128, within the first node 130, or within the distributed computing platform 102 such as by the application server tier 106. In another example, one or more SVMs may be hosted across one or more of the client device 128, the first node 130, and the distributed computing platform 102. The one or more SVMs may host instances of the storage operating system.

In an example, the storage operating system may be implemented for the distributed computing platform 102. The storage operating system may allow client devices to access data stored within the distributed computing platform 102 using various types of protocols, such as a Network File System (NFS) protocol, a Server Message Block (SMB) protocol and Common Internet File System (CIFS), and Internet Small Computer Systems Interface (iSCSI), and/or other protocols. The storage operating system may provide various storage services, such as disaster recovery (e.g., the ability to non-disruptively transition client devices from accessing a primary node that has failed to a secondary node that is taking over for the failed primary node), backup and archive function, replication such as asynchronous and/or synchronous replication, deduplication, compression, high availability storage, cloning functionality (e.g., the ability to clone a volume, such as a space efficient flex clone), snapshot functionality (e.g., the ability to create snapshots and restore data from snapshots), data tiering (e.g., migrating infrequently accessed data to slower/cheaper storage), encryption, managing storage across various platforms such as between on-premise storage systems and multiple cloud systems, etc.

In one example of the distributed computing platform 102, one or more SVMs may be hosted by the application server tier 106. For example, a server (1) 116 is configured to host SVMs used to execute applications such as storage applications that manage the storage of data of the client (1) within the client (1) data store 122. Thus, an SVM executing on the server (1) 116 may receive data and/or operations from the client device 128 and/or the first node 130 over the network 126. The SVM executes a storage application and/or an instance of the storage operating system to process the operations and/or store the data within the client (1) data store 122. The SVM may transmit a response back to the client device 128 and/or the first node 130 over the network 126, such as a success message or an error message. In this way, the application server tier 106 may host SVMs, services, and/or other storage applications using the server (1) 116, the server (N) 118, etc.

A user interface tier 104 of the distributed computing platform 102 may provide the client device 128 and/or the first node 130 with access to user interfaces associated with the storage and access of data and/or other services provided by the distributed computing platform 102. In an example, a service user interface 110 may be accessible from the distributed computing platform 102 for accessing services subscribed to by clients and/or nodes, such as data replication services, application hosting services, data security services, human resource services, warehouse tracking services, accounting services, etc. For example, client user interfaces may be provided to corresponding clients, such as a client (1) user interface 112, a client (N) user interface 114, etc. The client (1) can access various services and resources subscribed to by the client (1) through the client (1) user interface 112, such as access to a web service, a development environment, a human resource application, a warehouse tracking application, and/or other services and resources provided by the application server tier 106, which may use data stored within the data storage tier 108.

The client device 128 and/or the first node 130 may subscribe to certain types and amounts of services and resources provided by the distributed computing platform 102. For example, the client device 128 may establish a subscription to have access to three virtual machines, a certain amount of storage, a certain type/amount of data redundancy, a certain type/amount of data security, certain service level agreements (SLAs) and service level objectives (SLOs), latency guarantees, bandwidth guarantees, access to execute or host certain applications, etc. Similarly, the first node 130 can establish a subscription to have access to certain services and resources of the distributed computing platform 102.

As shown, a variety of clients, such as the client device 128 and the first node 130, incorporating and/or incorporated into a variety of computing devices may communicate with the distributed computing platform 102 through one or more networks, such as the network 126. For example, a client may incorporate and/or be incorporated into a client application (e.g., software) implemented at least in part by one or more of the computing devices.

Examples of suitable computing devices include personal computers, server computers, desktop computers, nodes, storage servers, nodes, laptop computers, notebook computers, tablet computers or personal digital assistants (PDAs), smart phones, cell phones, and consumer electronic devices incorporating one or more computing device components, such as one or more electronic processors, microprocessors, central processing units (CPU), or controllers. Examples of suitable networks include networks utilizing wired and/or wireless communication technologies and networks operating in accordance with any suitable networking and/or communication protocol (e.g., the Internet). In use cases involving the delivery of customer support services, the computing devices noted represent the endpoint of the customer support delivery process, i.e., the consumer's device.

The distributed computing platform 102, such as a multi-tenant business data processing platform or cloud computing environment, may include multiple processing tiers, including the user interface tier 104, the application server tier 106, and a data storage tier 108. The user interface tier 104 may maintain multiple user interfaces, including graphical user interfaces and/or web-based interfaces. The user interfaces may include the service user interface 110 for a service to provide access to applications and data for a client (e.g., a "tenant") of the service, as well as one or more user interfaces that have been specialized/customized in accordance with user specific requirements (e.g., as discussed above), which may be accessed via one or more APIs.

The service user interface 110 may include components enabling a tenant to administer the tenant's participation in the functions and capabilities provided by the distributed computing platform 102, such as accessing data, causing execution of specific data processing operations, etc. Each processing tier may be implemented with a set of computers, virtualized computing environments such as a storage virtual machine or storage virtual server, and/or computer components including computer servers and processors, and may perform various functions, methods, processes, or operations as determined by the execution of a software application or set of instructions.

The data storage tier 108 may include one or more data stores, which may include the service data store 120 and one or more client data stores 122-124. Each client data store may contain tenant-specific data that is used as part of providing a range of tenant-specific business and storage services or functions, including but not limited to ERP, CRM, eCommerce, Human Resources management, payroll, storage services, etc. Data stores may be implemented with any suitable data storage technology, including structured query language (SQL) based relational database management systems (RDBMS), file systems hosted by operating systems, object storage, etc.

The distributed computing platform 102 may be a multi-tenant and service platform operated by an entity in order to provide multiple tenants with a set of business related applications, data storage, and functionality. These applications and functionality may include ones that a business uses to manage various aspects of its operations. For example, the applications and functionality may include providing web-based access to business information systems, thereby allowing a user with a browser and an Internet or intranet connection to view, enter, process, or modify certain types of business information or any other type of information.

Figure 2:
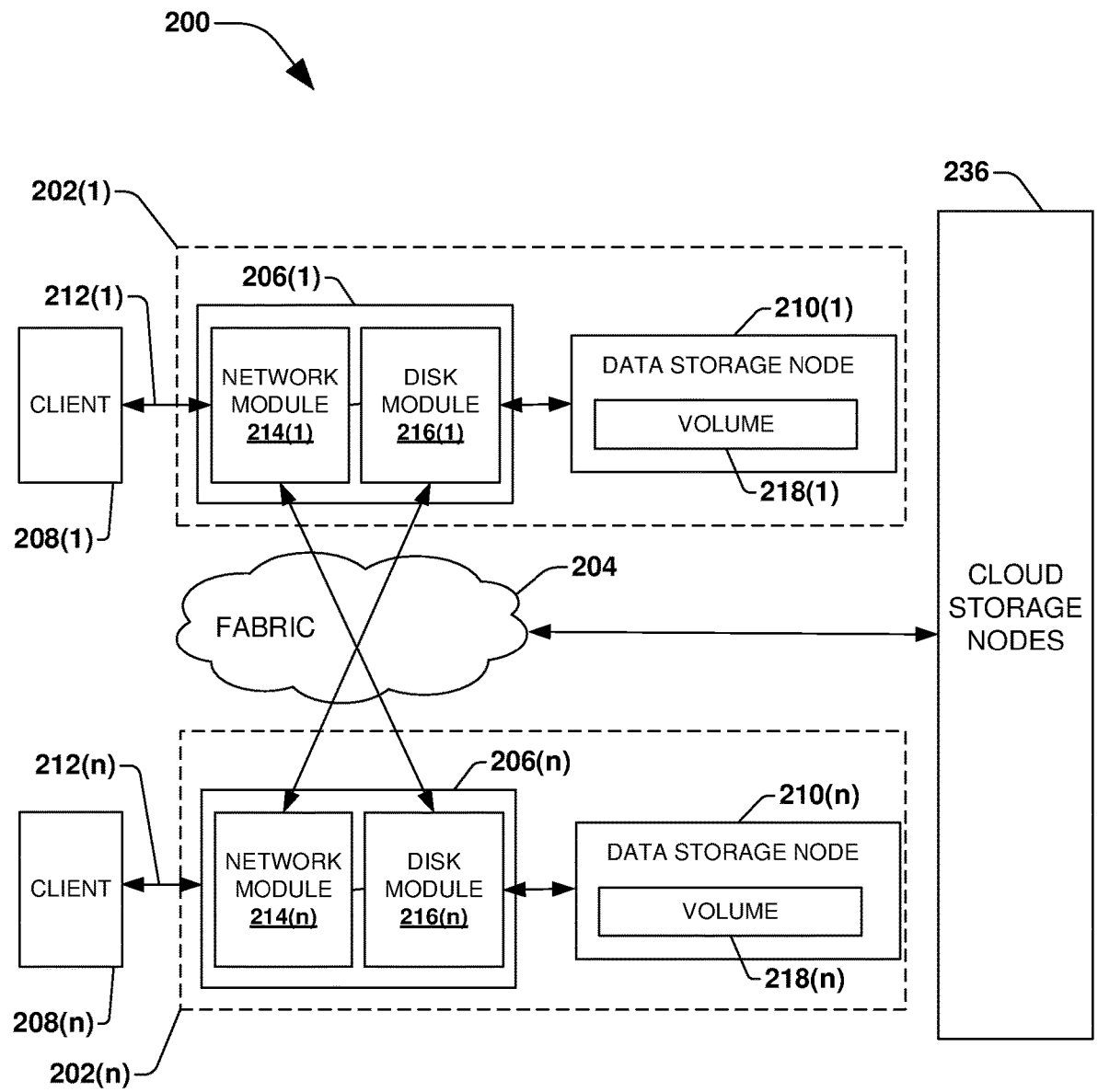
FIG. 2 is a block diagram illustrating a network environment with exemplary node computing devices.

A clustered network environment 200 that may implement one or more aspects of the techniques described and illustrated herein is shown in FIG. 2. The clustered network environment 200 includes data storage apparatuses 202(1)-202(n) that are coupled over a cluster or cluster fabric 204 that includes one or more communication network(s) and facilitates communication between the data storage apparatuses 202(1)-202(n) (and one or more modules, components, etc. therein, such as, node computing devices 206(1)-206(n), for example), although any number of other elements or components can also be included in the clustered network environment 200 in other examples. This technology provides a number of advantages including methods, non-transitory computer readable media, and computing devices that implement the techniques described herein.

In this example, node computing devices 206(1)-206(n) can be primary or local storage controllers or secondary or remote storage controllers that provide client devices 208(1)-208(n) with access to data stored within data storage devices 210(1)-210(n) and cloud storage device(s) 236 (also referred to as cloud storage node(s)). The node computing devices 206(1)-206(n) may be implemented as hardware, software (e.g., a storage virtual machine), or combination thereof.

The data storage apparatuses 202(1)-202(n) and/or node computing devices 206(1)-206(n) of the examples described and illustrated herein are not limited to any particular geographic areas and can be clustered locally and/or remotely via a cloud network, or not clustered in other examples. Thus, in one example the data storage apparatuses 202(1)-202(n) and/or node computing device 206(1)-206(n) can be distributed over a plurality of storage systems located in a plurality of geographic locations (e.g., located on-premise, located within a cloud computing environment, etc.); while in another example a clustered network can include data storage apparatuses 202(1)-202(n) and/or node computing device 206(1)-206(n) residing in a same geographic location (e.g., in a single on-site rack).

In the illustrated example, one or more of the client devices 208(1)-208(n), which may be, for example, personal computers (PCs), computing devices used for storage (e.g., storage servers), or other computers or peripheral devices, are coupled to the respective data storage apparatuses 202(1)-202(n) by network connections 212(1)-212(n). Network connections 212(1)-212(n) may include a local area network (LAN) or wide area network (WAN) (i.e., a cloud network), for example, that utilize TCP/IP and/or one or more Network Attached Storage (NAS) protocols, such as a Common Internet Filesystem (CIFS) protocol or a Network Filesystem (NFS) protocol to exchange data packets, a Storage Area Network (SAN) protocol, such as Small Computer System Interface (SCSI) or Fiber Channel Protocol (FCP), an object protocol, such as simple storage service (S3), and/or non-volatile memory express (NVMe), for example.

Illustratively, the client devices 208(1)-208(n) may be general-purpose computers running applications and may interact with the data storage apparatuses 202(1)-202(n) using a client/server model for exchange of information. That is, the client devices 208(1)-208(n) may request data from the data storage apparatuses 202(1)-202(n) (e.g., data on one of the data storage devices 210(1)-210(n) managed by a network storage controller configured to process I/O commands issued by the client devices 208(1)-208(n)), and the data storage apparatuses 202(1)-202(n) may return results of the request to the client devices 208(1)-208(n) via the network connections 212(1)-212(n).

The node computing devices 206(1)-206(n) of the data storage apparatuses 202(1)-202(n) can include network or host nodes that are interconnected as a cluster to provide data storage and management services, such as to an enterprise having remote locations, cloud storage (e.g., a storage endpoint may be stored within cloud storage device(s) 236), etc., for example. Such node computing devices 206(1)-206(n) can be attached to the cluster fabric 204 at a connection point, redistribution point, or communication endpoint, for example. One or more of the node computing devices 206(1)-206(n) may be capable of sending, receiving, and/or forwarding information over a network communications channel, and could comprise any type of device that meets any or all of these criteria.

In an example, the node computing devices 206(1) and 206(n) may be configured according to a disaster recovery configuration whereby a surviving node provides switchover access to the storage devices 210(1)-210(n) in the event a disaster occurs at a disaster storage site (e.g., the node computing device 206(1) provides client device 212(n) with switchover data access to data storage devices 210(n) in the event a disaster occurs at the second storage site). In other examples, the node computing device 206(n) can be configured according to an archival configuration and/or the node computing devices 206(1)-206(n) can be configured based on another type of replication arrangement (e.g., to facilitate load sharing). Additionally, while two node computing devices are illustrated in FIG. 2, any number of node computing devices or data storage apparatuses can be included in other examples in other types of configurations or arrangements.

As illustrated in the clustered network environment 200, node computing devices 206(1)-206(n) can include various functional components that coordinate to provide a distributed storage architecture. For example, the node computing devices 206(1)-206(n) can include network modules 214(1)-214(n) and disk modules 216(1)-216(n). Network modules 214(1)-214(n) can be configured to allow the node computing devices 206(1)-206(n) (e.g., network storage controllers) to connect with client devices 208(1)-208(n) over the storage network connections 212(1)-212(n), for example, allowing the client devices 208(1)-208(n) to access data stored in the clustered network environment 200.

Further, the network modules 214(1)-214(n) can provide connections with one or more other components through the cluster fabric 204. For example, the network module 214(1) of node computing device 206(1) can access the data storage device 210(n) by sending a request via the cluster fabric 204 through the disk module 216(n) of node computing device 206(n) when the node computing device 206(n) is available. Alternatively, when the node computing device 206(n) fails, the network module 214(1) of node computing device 206(1) can access the data storage device 210(n) directly via the cluster fabric 204. The cluster fabric 204 can include one or more local and/or wide area computing networks (i.e., cloud networks) embodied as Infiniband, Fibre Channel (FC), or Ethernet networks, for example, although other types of networks supporting other protocols can also be used.

Disk modules 216(1)-216(n) can be configured to connect data storage devices 210(1)-210(n), such as disks or arrays of disks, SSDs, flash memory, or some other form of data storage, to the node computing devices 206(1)-206(n). Often, disk modules 216(1)-216(n) communicate with the data storage devices 210(1)-210(n) according to the SAN protocol, such as SCSI or FCP, for example, although other protocols can also be used. Thus, as seen from an operating system on node computing devices 206(1)-206(n), the data storage devices 210(1)-210(n) can appear as locally attached. In this manner, different node computing devices 206(1)-206(n), etc. may access data blocks, files, or objects through the operating system, rather than expressly requesting abstract files.

While the clustered network environment 200 illustrates an equal number of network modules 214(1)-214(n) and disk modules 216(1)-216(n), other examples may include a differing number of these modules. For example, there may be a plurality of network and disk modules interconnected in a cluster that do not have a one-to-one correspondence between the network and disk modules. That is, different node computing devices can have a different number of network and disk modules, and the same node computing device can have a different number of network modules than disk modules.

Further, one or more of the client devices 208(1)-208(n) can be networked with the node computing devices 206(1)-206(n) in the cluster, over the storage connections 212(1)-212(n). As an example, respective client devices 208(1)-208(n) that are networked to a cluster may request services (e.g., exchanging of information in the form of data packets) of node computing devices 206(1)-206(n) in the cluster, and the node computing devices 206(1)-206(n) can return results of the requested services to the client devices 208(1)-208(n). In one example, the client devices 208(1)-208(n) can exchange information with the network modules 214(1)-214(n) residing in the node computing devices 206(1)-206(n) (e.g., network hosts) in the data storage apparatuses 202(1)-202(n).

In one example, the storage apparatuses 202(1)-202(n) host aggregates corresponding to physical local and remote data storage devices, such as local flash or disk storage in the data storage devices 210(1)-210(n), for example. One or more of the data storage devices 210(1)-210(n) can include mass storage devices, such as disks of a disk array. The disks may comprise any type of mass storage devices, including but not limited to magnetic disk drives, flash memory, and any other similar media adapted to store information, including, for example, data and/or parity information.

The aggregates include volumes 218(1)-218(n) in this example, although any number of volumes can be included in the aggregates. The volumes 218(1)-218(n) are virtual data stores or storage objects that define an arrangement of storage and one or more filesystems within the clustered network environment 200. Volumes 218(1)-218(n) can span a portion of a disk or other storage device, a collection of disks, or portions of disks, for example, and typically define an overall logical arrangement of data storage. In one example volumes 218(1)-218(n) can include stored user data as one or more files, blocks, or objects that may reside in a hierarchical directory structure within the volumes 218(1)-218(n).

Volumes 218(1)-218(n) are typically configured in formats that may be associated with particular storage systems, and respective volume formats typically comprise features that provide functionality to the volumes 218(1)-218(n), such as providing the ability for volumes 218(1)-218(n) to form clusters, among other functionality. Optionally, one or more of the volumes 218(1)-218(n) can be in composite aggregates and can extend between one or more of the data storage devices 210(1)-210(n) and one or more of the cloud storage device(s) 236 to provide tiered storage, for example, and other arrangements can also be used in other examples.

In one example, to facilitate access to data stored on the disks or other structures of the data storage devices 210(1)-210(n), a filesystem may be implemented that logically organizes the information as a hierarchical structure of directories and files. In this example, respective files may be implemented as a set of disk blocks of a particular size that are configured to store information, whereas directories may be implemented as specially formatted files in which information about other files and directories are stored.

Data can be stored as files or objects within a physical volume and/or a virtual volume, which can be associated with respective volume identifiers. The physical volumes correspond to at least a portion of physical storage devices, such as the data storage devices 210(1)-210(n) (e.g., a Redundant Array of Independent (or Inexpensive) Disks (RAID system)) whose address, addressable space, location, etc. does not change. Typically the location of the physical volumes does not change in that the range of addresses used to access it generally remains constant.

Virtual volumes, in contrast, can be stored over an aggregate of disparate portions of different physical storage devices. Virtual volumes may be a collection of different available portions of different physical storage device locations, such as some available space from disks, for example. It will be appreciated that since the virtual volumes are not "tied" to any one particular storage device, virtual volumes can be said to include a layer of abstraction or virtualization, which allows it to be resized and/or flexible in some regards.

Further, virtual volumes can include one or more logical unit numbers (LUNs), directories, Qtrees, files, and/or other storage objects, for example. Among other things, these features, but more particularly the LUNs, allow the disparate memory locations within which data is stored to be identified, for example, and grouped as data storage unit. As such, the LUNs may be characterized as constituting a virtual disk or drive upon which data within the virtual volumes is stored within an aggregate. For example, LUNs are often referred to as virtual drives, such that they emulate a hard drive, while they actually comprise data blocks stored in various parts of a volume.

In one example, the data storage devices 210(1)-210(n) can have one or more physical ports, wherein each physical port can be assigned a target address (e.g., SCSI target address). To represent respective volumes, a target address on the data storage devices 210(1)-210(n) can be used to identify one or more of the LUNs. Thus, for example, when one of the node computing devices 206(1)-206(n) connects to a volume, a connection between the one of the node computing devices 206(1)-206(n) and one or more of the LUNs underlying the volume is created.

Respective target addresses can identify multiple of the LUNs, such that a target address can represent multiple volumes. The I/O interface, which can be implemented as circuitry and/or software in a storage adapter or as executable code residing in memory and executed by a processor, for example, can connect to volumes by using one or more addresses that identify the one or more of the LUNs.

Figure 3:
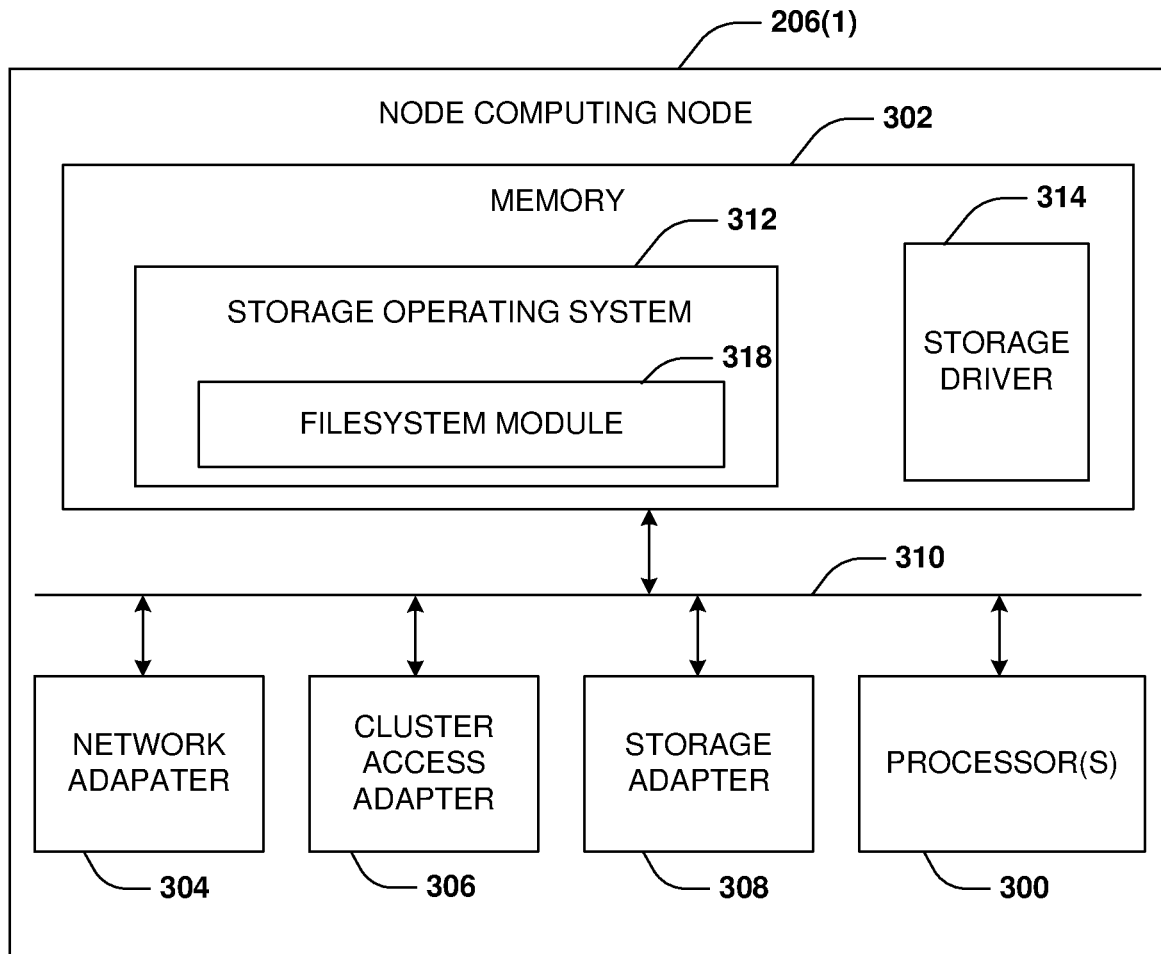
FIG. 3 is a block diagram illustrating an exemplary node computing device.

Referring to FIG. 3, node computing device 206(1) in this particular example includes processor(s) 300, a memory 302, a network adapter 304, a cluster access adapter 306, and a storage adapter 308 interconnected by a system bus 310. In other examples, the node computing device 206(1) comprises a virtual machine, such as a virtual storage machine. The node computing device 206(1) also includes a storage operating system 312 installed in the memory 302 that can, for example, implement a RAID data loss protection and recovery scheme to optimize reconstruction of data of a failed disk or drive in an array, along with other functionality such as deduplication, compression, snapshot creation, data mirroring, synchronous replication, asynchronous replication, encryption, etc. In some examples, the node computing device 206(n) is substantially the same in structure and/or operation as node computing device 206(1), although the node computing device 206(n) can also include a different structure and/or operation in one or more aspects than the node computing device 206(1).

The network adapter 304 in this example includes the mechanical, electrical and signaling circuitry needed to connect the node computing device 206(1) to one or more of the client devices 208(1)-208(n) over network connections 212(1)-212(n), which may comprise, among other things, a point-to-point connection or a shared medium, such as a local area network. In some examples, the network adapter 304 further communicates (e.g., using TCP/IP) via the cluster fabric 204 and/or another network (e.g. a WAN) (not shown) with cloud storage device(s) 236 to process storage operations associated with data stored thereon.

The storage adapter 308 cooperates with the storage operating system 312 executing on the node computing device 206(1) to access information requested by one of the client devices 208(1)-208(n) (e.g., to access data on a data storage device 210(1)-210(n) managed by a network storage controller). The information may be stored on any type of attached array of writeable media such as magnetic disk drives, flash memory, and/or any other similar media adapted to store information.

In the exemplary data storage devices 210(1)-210(n), information can be stored in data blocks on disks. The storage adapter 308 can include I/O interface circuitry that couples to the disks over an I/O interconnect arrangement, such as a storage area network (SAN) protocol (e.g., Small Computer System Interface (SCSI), Internet SCSI (iSCSI), hyperSCSI, Fiber Channel Protocol (FCP)). The information is retrieved by the storage adapter 308 and, if necessary, processed by the processor(s) 300 (or the storage adapter 308 itself) prior to being forwarded over the system bus 310 to the network adapter 304 (and/or the cluster access adapter 306 if sending to another node computing device in the cluster) where the information is formatted into a data packet and returned to a requesting one of the client devices 208(1)-208(n) and/or sent to another node computing device attached via the cluster fabric 204. In some examples, a storage driver 314 in the memory 302 interfaces with the storage adapter to facilitate interactions with the data storage devices 210(1)-210(n).

The storage operating system 312 can also manage communications for the node computing device 206(1) among other devices that may be in a clustered network, such as attached to a cluster fabric 204. Thus, the node computing device 206(1) can respond to client device requests to manage data on one of the data storage devices 210(1)-210 (n) or cloud storage device(s) 236 (e.g., or additional clustered devices) in accordance with the client device requests.

The file system module 318 of the storage operating system 312 can establish and manage one or more filesystems including software code and data structures that implement a persistent hierarchical namespace of files and directories, for example. As an example, when a new data storage device (not shown) is added to a clustered network system, the file system module 318 is informed where, in an existing directory tree, new files associated with the new data storage device are to be stored. This is often referred to as "mounting" a filesystem.

In the example node computing device 206(1), memory 302 can include storage locations that are addressable by the processor(s) 300 and adapters 304, 306, and 308 for storing related software application code and data structures. The processor(s) 300 and adapters 304, 306, and 308 may, for example, include processing elements and/or logic circuitry configured to execute the software code and manipulate the data structures.

The storage operating system 312, portions of which are typically resident in the memory 302 and executed by the processor(s) 300, invokes storage operations in support of a file service implemented by the node computing device 206(1). Other processing and memory mechanisms, including various computer readable media, may be used for storing and/or executing application instructions pertaining to the techniques described and illustrated herein. For example, the storage operating system 312 can also utilize one or more control files (not shown) to aid in the provisioning of virtual machines.

In this particular example, the memory 302 also includes a module configured to implement the techniques described herein, including for example atomic writes for persistent memory as discussed above and further below.

The examples of the technology described and illustrated herein may be embodied as one or more non-transitory computer or machine readable media, such as the memory 302, having machine or processor-executable instructions stored thereon for one or more aspects of the present technology, which when executed by processor(s), such as processor(s) 300, cause the processor(s) to carry out the steps necessary to implement the methods of this technology, as described and illustrated with the examples herein. In some examples, the executable instructions are configured to perform one or more steps of a method described and illustrated later.

Figure 4:
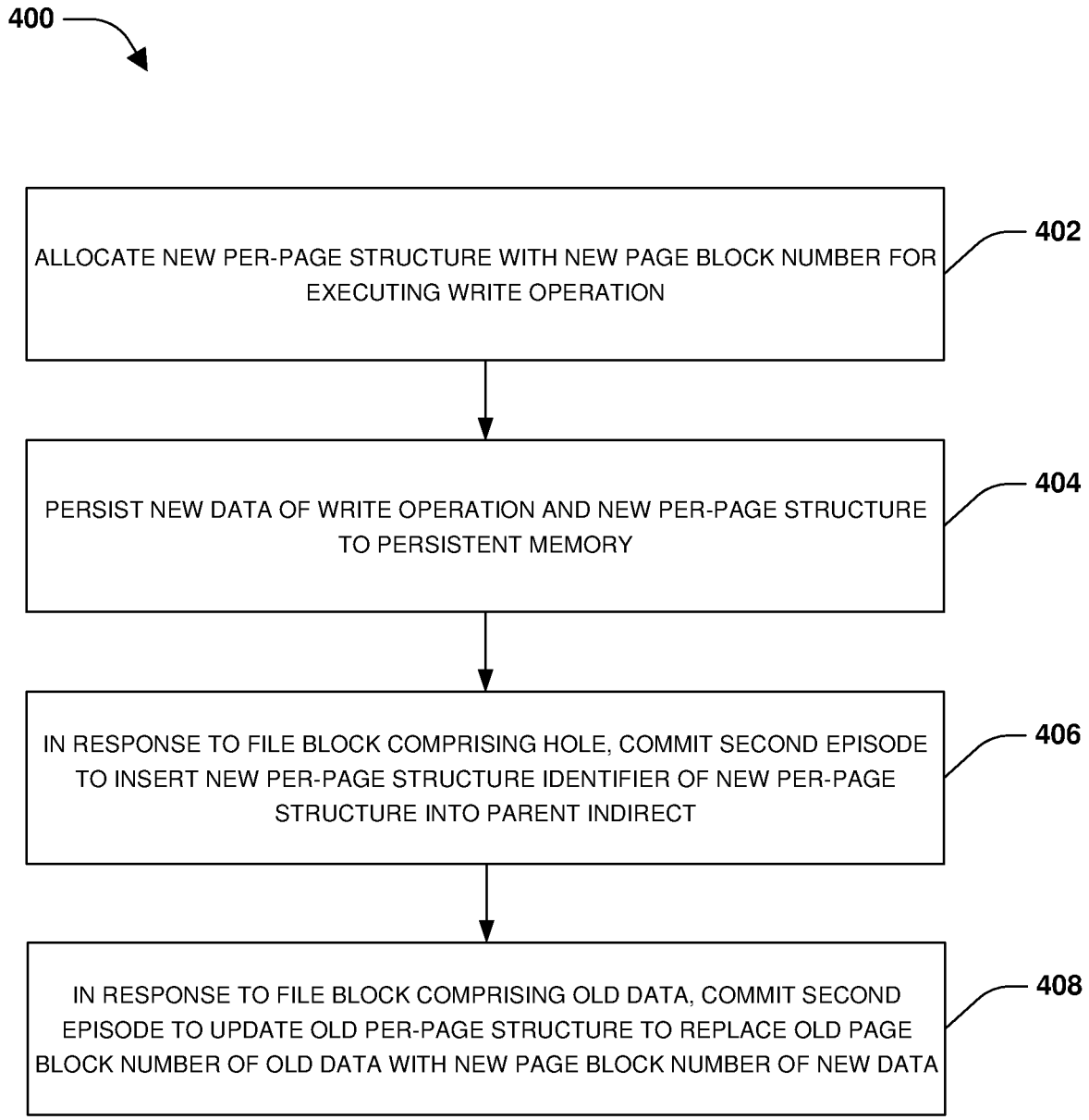
FIG. 4 is a flow chart illustrating an example method for atomic writes for persistent memory.
Figure 5A:
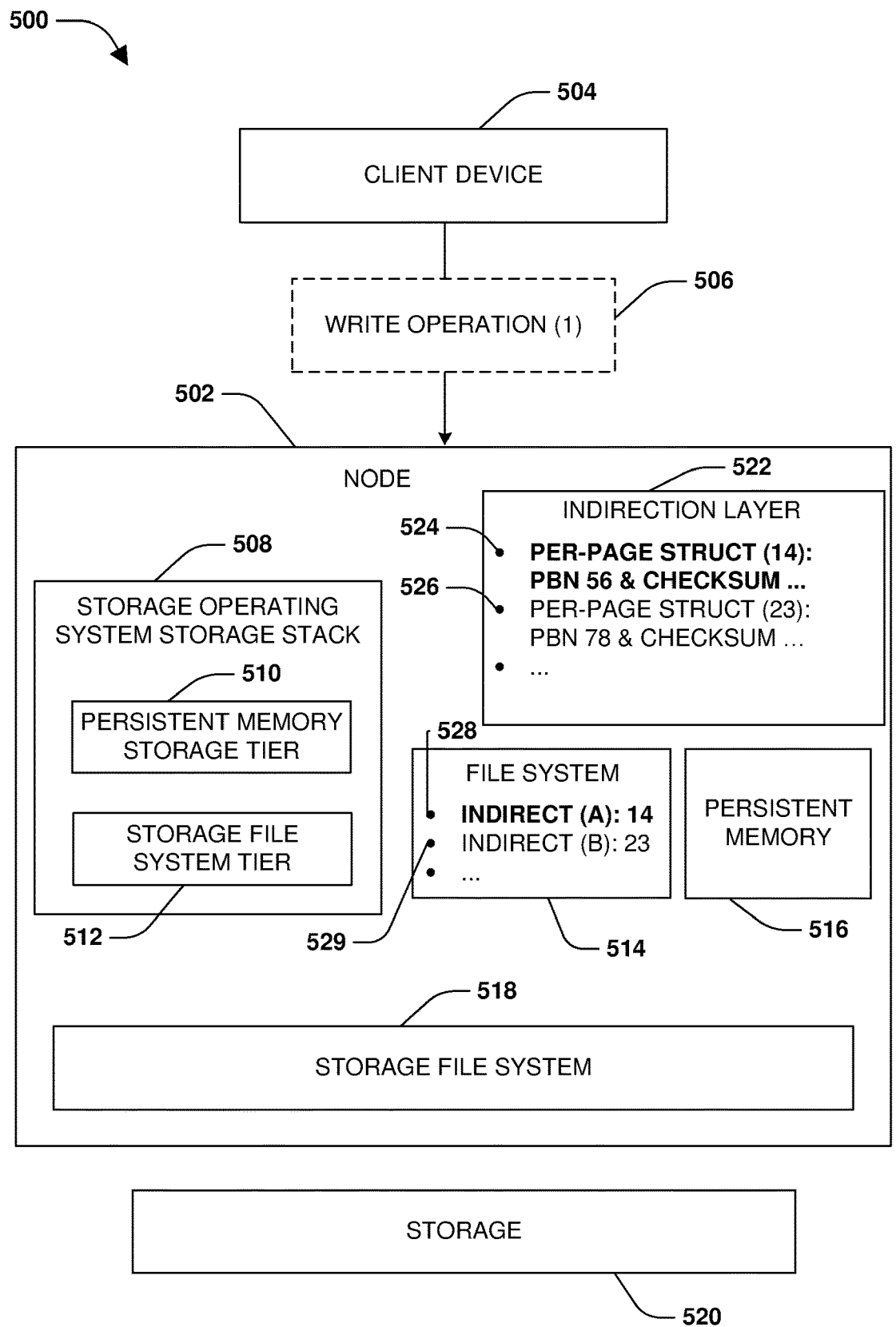
FIG. 5A is a block diagram illustrating an example system for atomic writes for persistent memory, where a first write operation is received.
Figure 5B:
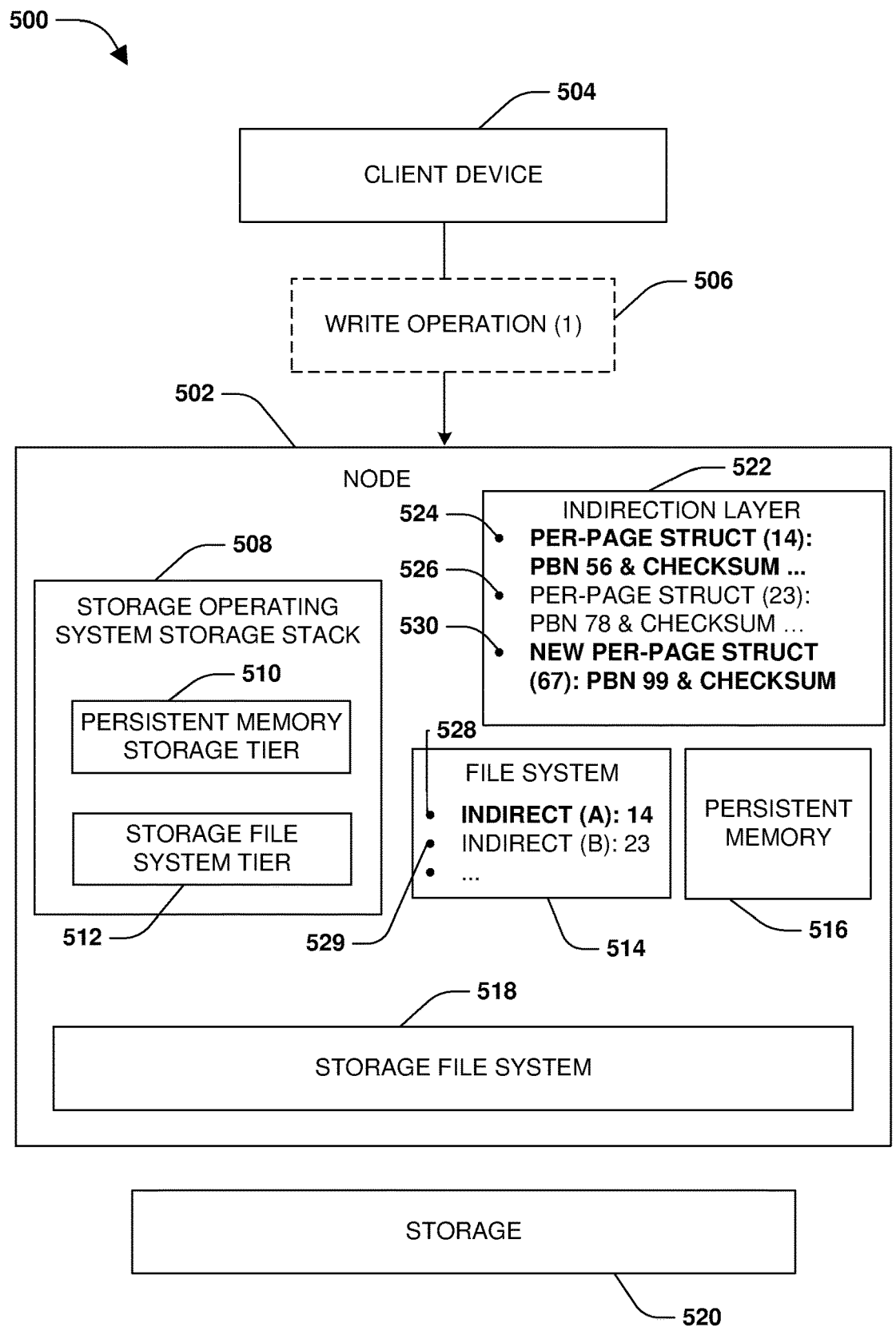
FIG. 5B is a block diagram illustrating an example system for atomic writes for persistent memory, where a new per-page structure and a new page block number are allocated.
Figure 5C:
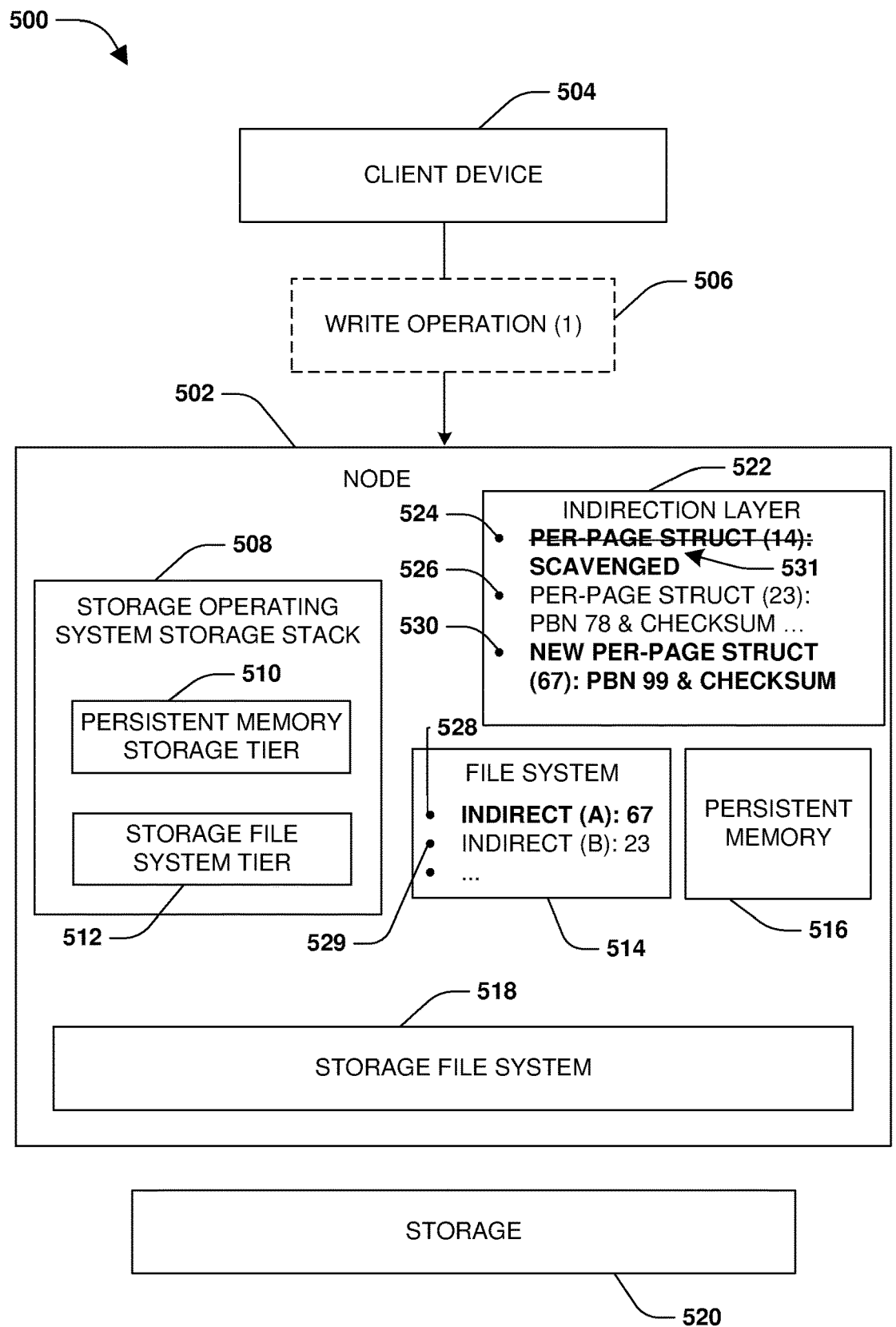
FIG. 5C is a block diagram illustrating an example system for atomic writes for persistent memory, where a new per-page structure and a new page block number are utilized for new data stored within the persistent memory.

One embodiment of atomic writes for persistent memory is illustrated by an exemplary method 400 of FIG. 4, which is further described in conjunction with system 500 of FIGS. 5A-5C (related to where an operation targets a hole) and FIGS. 6A-6D (related to where an operation targets existing/old data). A node 502 may comprise a server, an on-premise device, a virtual machine, computing resources of a cloud computing environment (e.g., a virtual machine hosted within the cloud), a computing device, hardware, software, or combination thereof. The node 502 may be configured to manage the storage and access of data on behalf of clients. The node 502 may host a storage operating system configured to store and manage data within and/or across various types of storage devices, such as locally attached storage, cloud storage, disk storage, flash storage, solid state drives, tape, hard disk drives, persistent memory, etc. The data may be stored within storage objects, such as volumes, logical unit numbers (LUNs), aggregates, cloud storage objects, etc. In an example, an aggregate or other storage object may be comprised of physical storage of a single storage device or storage of multiple storage devices or storage providers.

The storage operating system of the node 502 may implement a file system 514 that manages the storage and client access of data within the storage objects stored within the storage (e.g., persistent memory 516) associated with the node 502. For example, a client device 504 may utilize the file system 514 in order to create, delete, organize, modify, and/or access files within directories of a volume managed by the file system. In an example, the node 502 may utilize persistent memory 516 for storing client data. The persistent memory 516 may be byte-addressable and provide relatively lower latency and faster access speeds than other types of storage such as disk storage, cloud storage, etc. The file system 514 may be configured with commands, APIs, data structures (e.g., data structures used to identify byte address locations of data within the persistent memory 516), and/or other functionality (e.g., functionality to access certain byte ranges within the persistent memory 516) that is tailored to the byte-addressable access semantics of the persistent memory 516.

The storage operating system of the node 502 may implement a storage file system 518 that manages storage 520, such as block-addressable storage, disk storage, solid state drives, cloud storage, etc. (e.g., including storage 520). The storage file system 518 may be configured with commands, APIs, data structures (e.g., data structures used to identify block address locations of data the storage 520), and/or other functionality (e.g., functionality to access certain block ranges within storage 520) that is tailored to the block-addressable access semantics of the storage 520.

The storage operating system of the node 502 may implement a storage operating system storage stack 508. The storage operating system storage stack 508 may comprise a persistent memory storage tier 510 used to manage the persistent memory 516 through the file system 514. The storage operating system storage stack 508 may comprise a storage file system tier 512 used to manage the storage 516 through the storage file system 518. An operation may first be processed by a highest level tier within the storage operating system storage stack 508, and then down through lower level tiers of the storage operating system storage stack 508 until reaching a lowest level tier of the storage operating system storage stack 508. For example, the persistent memory storage tier 510 may process an operation before the operation reaches the storage file system tier 512 because the persistent memory storage tier 510 is at a higher level within the storage operating system storage stack 508 than the storage file system tier 512. In this way, the persistent memory storage tier 510 may determine whether the operation should be directed to the file system 514 for execution upon the persistent memory 516 or should be pass along to the storage file system tier 512 for directing the operation to the storage file system 518 for execution upon the storage 520.

In order to provide atomic writes for the persistent memory 516, an indirection layer 522 is implemented for the node 502. The indirection layer 522 is maintained between references to pages within the persistent memory (e.g., a reference in a parent indirect page to reference a physical location of data stored within the persistent memory 516) and page block numbers of physical page locations of the data within the persistent memory 516. The persistent memory 516 may be indexed into pages, such as 4 kb pages, that are addressable at page block numbers. The indirection layer 522 comprises per-page structures that are populated with the page block numbers of the pages of data within the persistent memory 516. In an embodiment, the per-page structures are populated with checksums of the data within the pages.

Each per-page structure is identified by a per-page structure identifier. A per-page structure identifier of a per-page structure for a page can be inserted into a parent indirect page that is a parent of the page within a file tree of a file. That is, the per-page structure identifier is inserted into the parent indirect page within the file tree of the file. The parent indirect page is a parent of the page within the file tree of the file. In an example, the page comprises actual user data of the file, and is located at a bottom level of the file tree of the file. The file tree may comprise a root (a root node), one or more levels of parent indirect pages, and the bottom level of pages comprising user data within pages of the persistent memory 516. Thus, the file tree can be traversed down to the page in order to access the data of the page.

Accordingly, instead of the parent indirect page comprising a reference with a page block number of the page, the parent indirect page comprises the per-page structure identifier that can be used to access the per-page structure. The page block number is a 4 kb offset within the persistent memory 516. A file block number is a 4 kb offset within a file's data. The per-page structure can be evaluated to identify the page block number of the page. This is because the per-page structures are populated with page block numbers. In an embodiment, the per-page structure identifiers are provided to the storage file system 518 and/or the storage file system tier 512. Thus, the storage file system 518 and/or the storage file system tier 512 can access the per-page structures of the indirection layer 522 using the per-page structure identifiers in order to identify page block numbers, of pages within the persistent memory 516, which are specified within the per-page structures.

In an example, the indirection layer 522 comprises a first per-page structure 524 having a per-page structure identifier (14). The first per-page structure 524 may correspond to a first page within the persistent memory 516 that is stored at page block number (56, illustrated as PBN 56). Accordingly, the page block number (56) of the first page is maintained within the first per-page structure 524. A checksum of the data within the first page is also stored within the first per-page structure 524. The indirection layer 522 comprises a second per-page structure 526 having a per-page structure identifier (23). The second per-page structure 526 may correspond to a second page within the persistent memory 516 that is stored at page block number (78). Accordingly, the page block number (78) of the second page is maintained within the second per-page structure 526. A checksum of the data within the second page is also stored within the second per-page structure 526.

The file system 514 for the persistent memory 516 may comprise a file tree for a file whose data may be stored within one or more pages of the persistent memory 516. The file tree may comprise a root that points to a first level of parent indirect pages (e.g., parent indirect pages that are parents of child pages within a next level down within the file tree, such as pages within a second level of parent indirect pages or pages within a bottom level of the file tree and comprising user data). The parent indirect pages in the first level may comprise references to pages in a second level within the file tree just below the first level of parent indirect pages. Depending on how many levels of parent indirect pages are within the file tree, these pages may be another level of parent indirect pages or may be pages comprising the actual data of the file. The file tree may comprise any number of levels of parent indirect pages. A lowest level of the file tree comprises pages corresponding to actual user data stored within the persistent memory 516.

Instead of a parent indirect page, that is a parent of a page, comprising a page block number as a reference to the page, the parent indirect page will instead comprise a per-page structure identifier of a per-page structure for the page. For example, a parent indirect page (A) 528 is a parent of a first page within the persistent memory 516. It may be appreciated that the first page may be any page within the persistent memory 516, and does not refer to a first occurring page within the persistent memory 516. Instead of the parent indirect page (A) 528 comprising the page block number (56) of the first page, the parent indirect page (A) 528 is populated with the per-page structure identifier (14) of the first per-page structure 524 for the first page. A parent indirect page (B) 529 is a parent of a second page within the persistent memory 516. It may be appreciated that the second page may be any page within the persistent memory 516, and does not refer to a second occurring page within the persistent memory 516. Instead of comprising the page block number (78) of the second page, the parent indirect page (B) 529 is populated with the per-page structure identifier (23) of the second per-page structure 526 for the second page. In an embodiment, a variable mapping between page block numbers and per-page structures is maintained, such that a page block number within a per-page structure can be variably changed to a different page block number.

The indirection layer 522 is utilized by the persistent memory storage tier 510 and the file system 514 for the persistent memory 516 to process operations received from client devices. For example, the node 502 may receive a first write operation 506 from the client device 504, as illustrated by FIG. 5A. The first write operation 506 may target a file block of the file, such as data within the first page within the persistent memory 516 (e.g., associated with the first per-page structure 524 in the indirection layer 522). The file block may correspond to a page of the file at a byte-range within the persistent memory 516. The persistent memory storage tier 510 may process the first write operation 506 before the storage file system tier 512 because the persistent memory storage tier 510 is at a higher level within the storage operation system storage stack 508 than the storage file system tier 512. The persistent memory storage tier 510 may determine that the first write operation 506 should be routed to the file system 514 for execution upon the persistent memory 516 (e.g., because the first write operation 506 targets a file already in the persistent memory 516, and the file should be retained within the persistent memory because the file that will likely be access again within a threshold timespan, and thus could benefit from the higher speed and latency of the persistent memory 516 compared to the storage 520).

At 402, a new per-page structure 530 with a new page block number (99) is allocated for executing the first write operation 506, as illustrated by FIG. 5B. Further with reference to FIG. 5B, the new per-page structure 530 has a new per-page structure identifier (67). At 404, new data of the first write operation 506 is committed to a new page within the persistent memory 516. The new data may be directed to a hole or existing data to be overwritten. The new page is located at the new page block number (99) that was allocated within the new per-page structure 530. The new page, at the new page block number (99), may be a different page than the first page, at the page block number (56), that is associated with the file block targeted by the first write operation 506. This is because the first write operation 506 is performed similar to a copy on write operation where the old data targeted by a write operation is not overwritten by the new data of the copy on write operation. In an embodiment, the new data is persisted as part of a first episode comprising one or more actions to commit to the persistent memory 516, thereby executing the first write operation 506. Actions within the first episode can be persisted in any order, and merely a single episode can be committed to the persistent memory 516 at a time, and thus a second episode may not be performed until the first episode has completed. In an embodiment, persistence of an episode may include performing the actions upon the persistent memory 516 of the node 502 and upon a partner persistent memory of a partner node.

Once the new data has been persisted to the persistent memory 516 into the new page located at the new page block number (99), a determination may be made as to whether the file block currently comprises a hole (e.g., a hole because the old data within the file block of the first page has been evicted from the persistent memory 516 since the first write operation 506 was received) or the old data (e.g., the old data within the file block of the first page is still stored within the persistent memory 516).

At 406, the file block is determined to comprise a hole (e.g., the old data has been evicted and scavenged 531 from the persistent memory 516 to create the hole), as illustrated by FIG. 5C. Accordingly, the new per-page structure identifier (67) of the new per-page structure 530 is inserted into the parent indirect page (A) 528 of the file tree of the file so that the parent indirect page (A) 528 now references the new per-page structure 530 comprising the new page block number (99) of the new page comprising the new data. In an embodiment, the new per-page structure identifier (67) is inserted into the parent indirect page (A) 528 through a second episode whose commitment to the persistent memory 516 is triggered by the first episode completing since a single episode can be committed at a time. In an embodiment, the new per-page structure identifier (67) is communicated to the storage file system tier 512 and/or the storage file system 518. The new per-page structure identifier (67) is used to update references to the file block from pointing to the first per-page structure 524 using the per-page structure identifier (14) to pointing to the new per-page structure 530 using the new per-page structure identifier (67). In this way, the storage file system 518 can use the new per-page structure identifier (67) for locating the new page located at the new page block number (99) within the persistent memory 516.

In an embodiment, an atomic operation is performed to store the new page block number (99) of the new page and a new checksum of the new data into the new per-page structure 530. For example, the new page block number (99) and the new checksum may be stored within 8 bytes. The persistent memory 516 may natively support atomic writes of 8 bytes, and thus the atomic operation will either succeed at writing both the new page block number (99) and the new checksum or will fail to write both. In an embodiment, an atomic operation is performed to store the new per-page structure identifier (67) and a new generation count (e.g., a number of times a page has been scavenged) into the parent indirect page (A) 528. In an embodiment of a hole, an atomic operation is performed to write a new per-page structure identifier and a new generation count into a parent indirect page. In an embodiment of overwriting old data, an atomic operation is performed to write the new page block number and a new checksum into an old per-page structure.

In an embodiment, an operation targeting the new data is received. The file tree of the file system 514 for the file is traversed down using an identifier within the operation in order to locate the new page of the new data targeted by the operation. During the traversal, the parent indirect page (A) 528 is encountered within the file tree. The new per-page structure identifier (67) is identified within the parent indirect page (A) 528. The new per-page structure identifier (67) within the parent indirect page (A) 528 is used to access the new per-page structure 530 for the new page. The new per-page structure 530 is evaluated to obtain the new page block number (99) of the new page. In this way, the new page block number (99) is used to access the new data within the new page of the persistent memory 516.

FIGS. 6A-6D illustrate operations performed if a file block comprises old data instead of a hole.

Figure 6A:
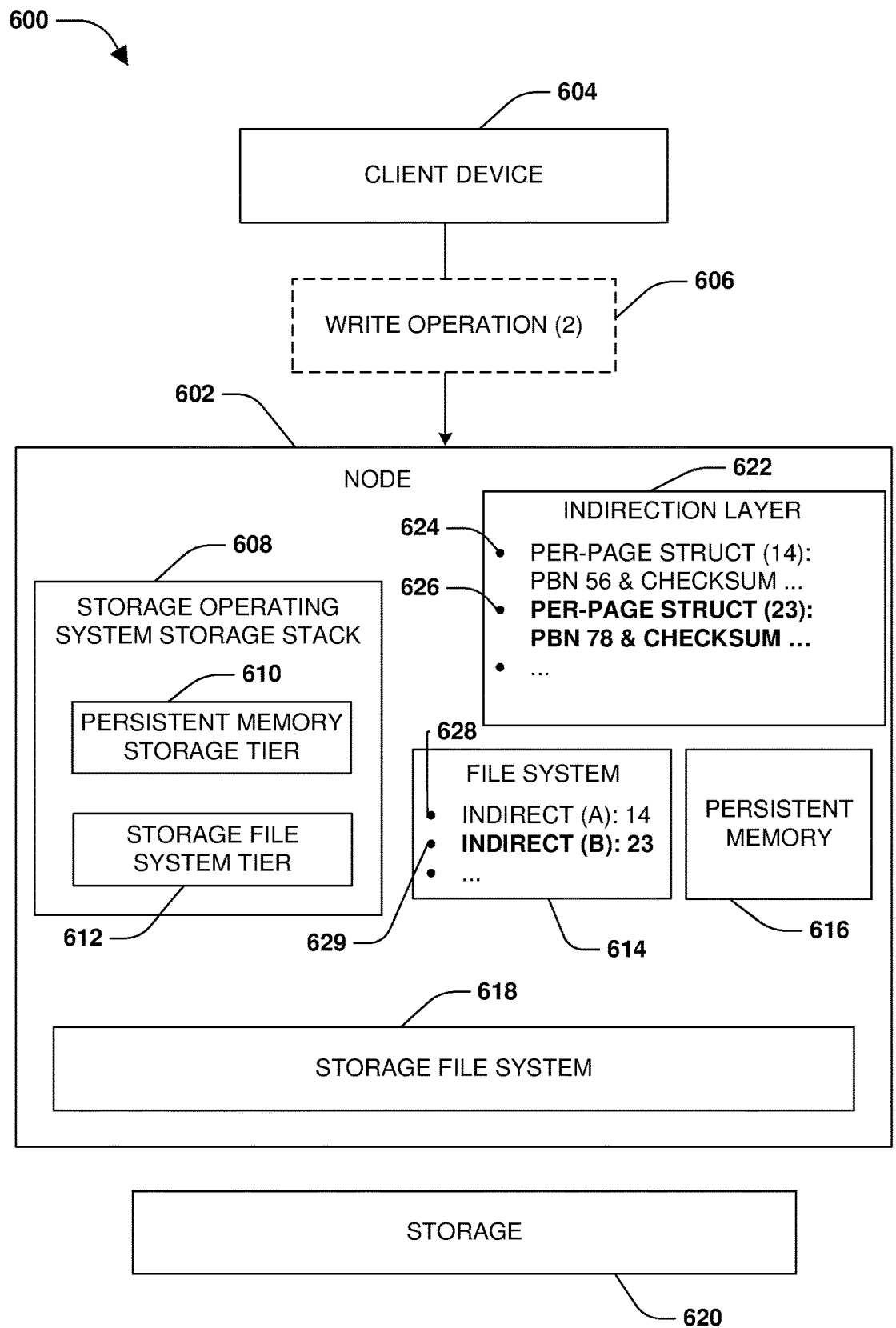
FIG. 6A is a block diagram illustrating an example system for atomic writes for persistent memory, where a second write operation is received.

FIG. 6A illustrates a node 602 configured to store data within persistent memory 616 through a file system 614 managed by a persistent memory storage tier 610 of a storage operating system storage stack 608. The node 602 is configured to store data within storage 620, such as disk storage, cloud storage, solid state storage, block-addressable storage, etc., through a storage file system 618 managed by a storage file system tier 612 of the storage operating system storage stack 608.

In an example, an indirection layer 622 comprises a first per-page structure 624 having a per-page structure identifier (14). The first per-page structure 624 may correspond to a first page within the persistent memory 616 that is stored at page block number (56). Accordingly, the page block number (56) of the first page is maintained within the first per-page structure 624. A checksum of the data within the first page is also stored within the first per-page structure 624. The indirection layer 622 comprises a second per-page structure 626 having a per-page structure identifier (23). The second per-page structure 626 may correspond to a second page within the persistent memory 616 that is stored at page block number (78). Accordingly, the page block number (78) of the second page is maintained within the second per-page structure 626. A checksum of the data within the second page is also stored within the second per-page structure 626.

The file system 614 for the persistent memory 616 may comprise a file tree for a file whose data may be stored within one or more pages of the persistent memory 616. The file tree may comprise a root, one or more levels of parent indirect pages, and a lowest level of pages comprising user data stored within the persistent memory 616. Instead of a parent indirect page comprising a page block number of a page (a child page) referenced by the parent indirect page, the parent indirect page will instead comprise a per-page structure identifier of a per-page structure for the page. For example, a parent indirect page (A) 628 is a parent of a first page within the persistent memory 616. It may be appreciated that the first page may be any page within the persistent memory 616, and does not refer to a first occurring page within the persistent memory 616. Instead of comprising the page block number (56) of the first page, the parent indirect page (A) 628 is populated with the per-page structure identifier (14) of the first per-page structure 624 for the first page. A parent indirect page (B) 629 is a parent of a second page within the persistent memory 616. It may be appreciated that the second page may be any page within the persistent memory 616, and does not refer to a second occurring page within the persistent memory 616. Instead of comprising the page block number (78) of the second page, the parent indirect page (B) 629 is populated with the per-page structure identifier (23) of the second per-page structure 626 for the second page. In an embodiment, a variable mapping between page block numbers and per-page structures is maintained, such that a page block number within a per-page structure can be variably changed to a different page block number.

The indirection layer 622 is utilized by the persistent memory storage tier 610 and the file system 628 for the persistent memory 616 to process operations received from client devices. For example, the node 602 may receive a second write operation 606 from the client device 604, as illustrated by FIG. 6A. The second write operation 606 may target a file block of the file, such as data within the second page within the persistent memory 616. The persistent memory storage tier 610 may process the second write operation 606 before the storage file system tier 612 because the persistent memory storage tier 610 is at a higher level within the storage operation system storage stack 608 than the storage file system tier 612. The persistent memory storage tier 610 may determine that the second write operation 606 should be routed to the file system 614 for execution upon the persistent memory 616.

Figure 6B:
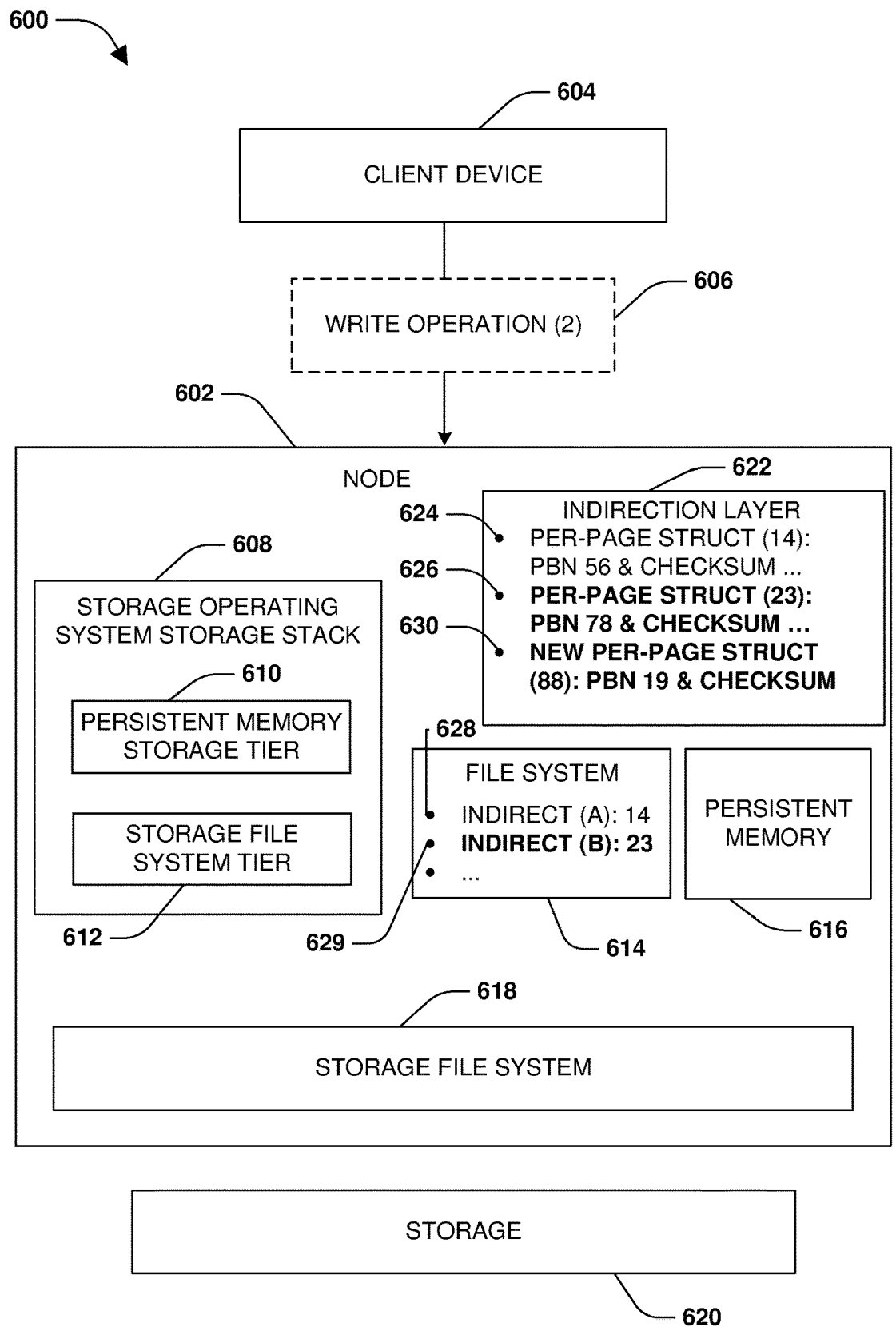
FIG. 6B is a block diagram illustrating an example system for atomic writes for persistent memory, where a new per-page structure and a new page block number are allocated.

A new per-page structure 630 with a new page block number (19) is allocated for executing the second write operation 606, as illustrated by FIG. 6B. The new per-page structure 630 has a new per-page structure identifier (88). New data of the second write operation 606 is committed to a new page within the persistent memory 616. The new page is located at the new page block number (19) that was allocated within the new per-page structure 630. The new page, at the new page block number (19), may be a different page than the second page, at the page block number (78), that is associated with the file block targeted by the second write operation 606. This is because the second write operation 606 is performed similar to a copy on write operation where old data targeted by the copy on write operation is not overwritten by the new data of the copy on write operation. In an embodiment, the new data is persisted as part of a first episode comprising one or more actions to commit to the persistent memory 616, thereby executing the second write operation 606. Actions within the first episode can be persisted in any order, and merely a single episode can be committed to the persistent memory 616 at a time, and thus a second episode may not be performed until the first episode has completed.

Once the new data has been persisted to the persistent memory 616 in the new page located as the new page block number (19), a determination may be made as to whether the file block currently comprises a hole (e.g., the old data within the file block of the second page has been evicted from the persistent memory 616 since the second write operation 606 was received) or the old data (e.g., the old data within the file block of the second page is still stored within the persistent memory 616).

Figure 6C:
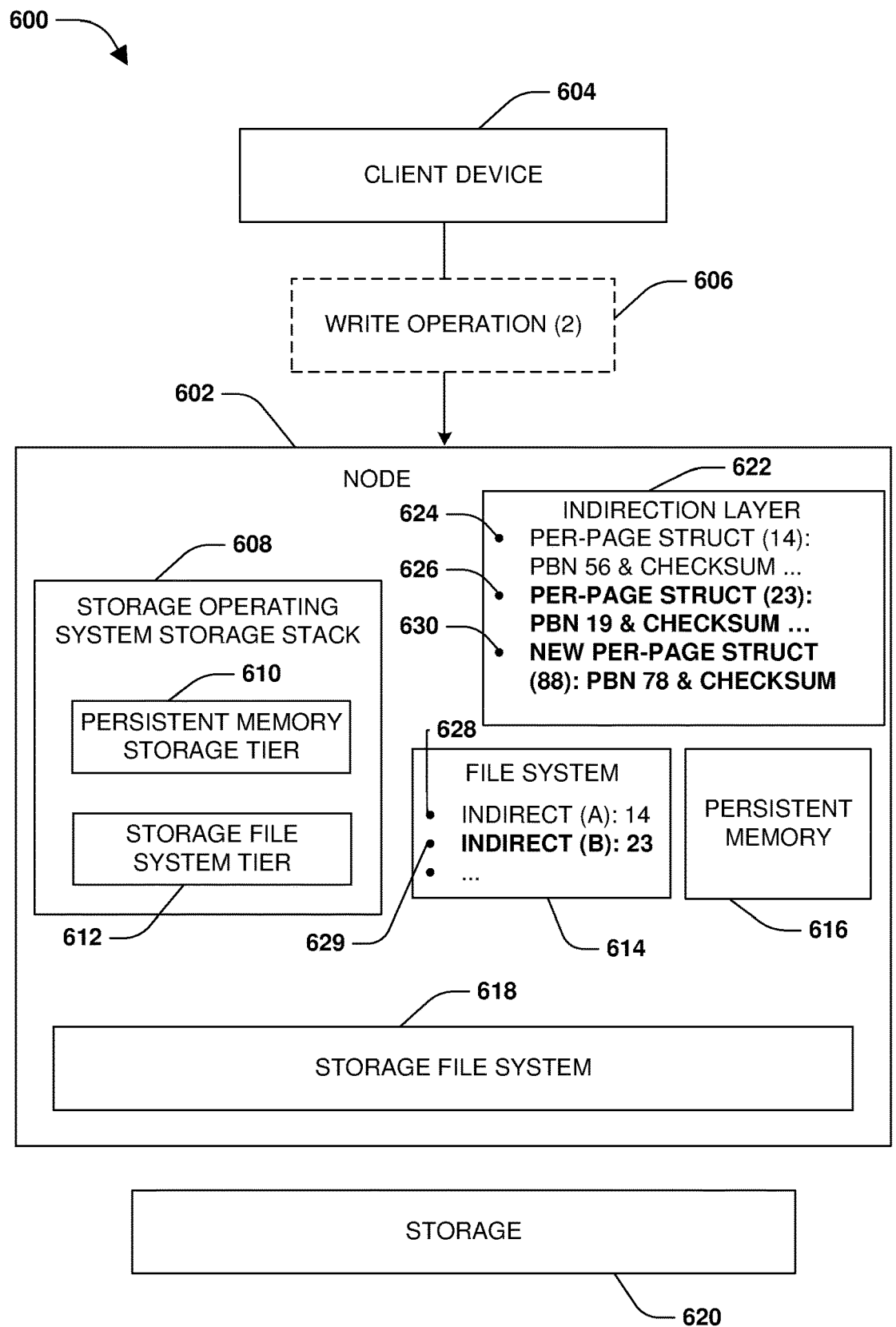
FIG. 6C is a block diagram illustrating an example system for atomic writes for persistent memory, where an old per-page structure is updated to replace an old page block number with a new page block number.
Figure 6D:
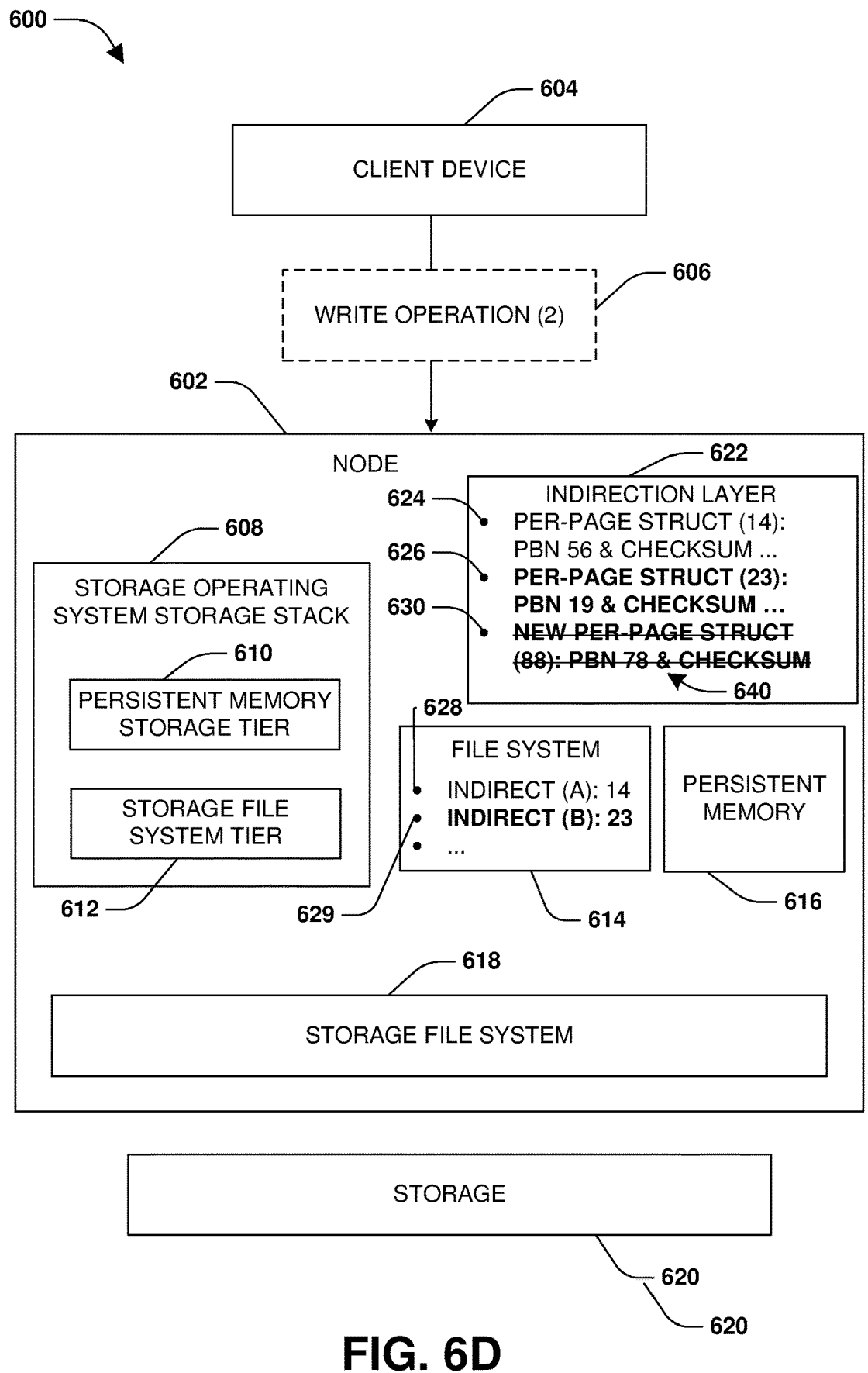
FIG. 6D is a block diagram illustrating an example system for atomic writes for persistent memory, where a new per-page structure is updated to replace a new page block number with an old page block number, and the new per-page structure and the old page block number are freed.

In an embodiment, the file block is determined to still comprise old data. Accordingly, at 408, the second per-page structure 626 (an old per-page structure) is updated to replace the page block number (78) of the second page (an old page block number of an old page) within the second per-page structure 626 with the new page block number (19) of the new page, as illustrated by FIG. 6C. In response to updating the second per-page structure 626 (the old per-page structure), the new per-page structure 630 is updated to replace the new page block number (19) with the page block number (78) (the old page block number). The new per-page structure 630 with the page block number (78) (the old page block number) are freed 640, as illustrated by FIG. 6D.

In an embodiment, an operation targeting the new data is received. The file tree of the file system 614 for the file is traversed down using an identifier within the operation in order to locate the new page comprising the new data targeted by the operation. During the traversal, the parent indirect page (B) 629 is encountered within the file tree. The second per-page structure identifier (23) is identified within the parent indirect page (B) 629. The second per-page structure identifier (23) within the parent indirect page (B) 629 is used to access the second per-page structure 626 for the new page. The second per-page structure 626 is evaluated to obtain the new page block number (19) of the new page. In this way, the new page block number (19) is used to access the new data within the new page of the persistent memory 616.

In an embodiment, persistent memory of a node may natively support a first atomicity size, such as 8 bytes. However, an indirection layer may support a second atomicity size that is larger than the first atomicity size natively supported by the persistent memory. For example, the indirection layer may index the persistent memory into 4 kb pages, and thus can provide atomic operations of 4 kb to guarantee that a write operation will either succeed at completely writing all data to a 4 kb page within the persistent memory or will completely fail to write any data to the 4 kb page within the persistent memory.

In an embodiment, a write operation targeting persistent memory may be associated with a protocol, such as a SAN protocol, an NVMe protocol, or any other protocol or storage protocol. The protocol may guarantee an atomicity size greater than the first atomicity size and/or the second atomicity size, such as an atomicity size greater than a page size of pages within the persistent memory (e.g., greater than 4 kb). Accordingly, a number of pages within the persistent memory used to accommodate the atomicity size is determined (e.g., 16 pages to accommodate a 64 kb atomicity size). A new per-page structure and a new page block number is allocated for each of the pages (e.g., 16 new per-page structures and 16 new page block numbers are allocated). A plurality of entries are logged within a log to track the pages being modified by the write operation. An entry within the log may specify a volume targeted by the write operation, a file targeted by the write operation, and/or a file block number of a page being modified. If a failure occurs during execution of the write operation, then a target entry within the log can be identified and used to determine a restart point for continuing processing the write operation, such as a per-page structure and page block number of a next page after a page successfully modified by the write operation.

In an embodiment, parent indirect pages can be holes or not. Indirect data changes may be written in-place within persistent memory. That is, a write to a parent indirect page may occur in place because the write is only going to change indirect entries, to child pages, within the parent indirect page. These changes can be atomic. In an example, if a parent indirect page is present within the persistent memory, then content within the parent indirect page is written to or read from (e.g., in order to traverse down a file tree). Else, the child page that is being targeted is a hole. In this case, a new per-page structure and a new page block number populated with new content for the parent indirect page is allocated, and may be committed in an episode. Once the episode completes, a determination is performed to see if there is still a hole in the parent indirect page. If there is still a hole, then a new per-page structure identifier of the new per-page structure and a generation count for the new page is inserted into its parent indirect page. If there is not a hole (e.g., another operation filled the parent indirect page), then the new per-page structure identifier and the new page block number are freed. Accordingly, the present child page is utilized (e.g., the present child page is an indirect). This example may pertain to where a file tree is being traversed down. If a parent indirect page is present, then the parent indirect page is used. If the parent indirect page is not present (a hole), then the parent indirect page is filled with corresponding data.

According to a aspects of the present disclosure, an apparatus/machine/system for implementing atomic writes for persistent memory; a means for allocating a new per-page structure with a new page block number for executing a write operation, targeting a file block of a file, upon persistent memory of a node; a means for persisting new data of the write operation to a new page within the persistent memory having the new page block number and persisting the new per-page structure to the persistent memory; a means for inserting a new per-page structure identifier of the new per-page structure into a parent indirect page of a file tree of the file based upon the file block comprising a hole, wherein the parent indirect page is a parent of a page corresponding to the new data written to the new page block number; and a means for updating an old per-page structure to replace an old page block number of old data with the new page block number of the new data within the persistent memory based upon the file block comprising the old data.

Figure 7:
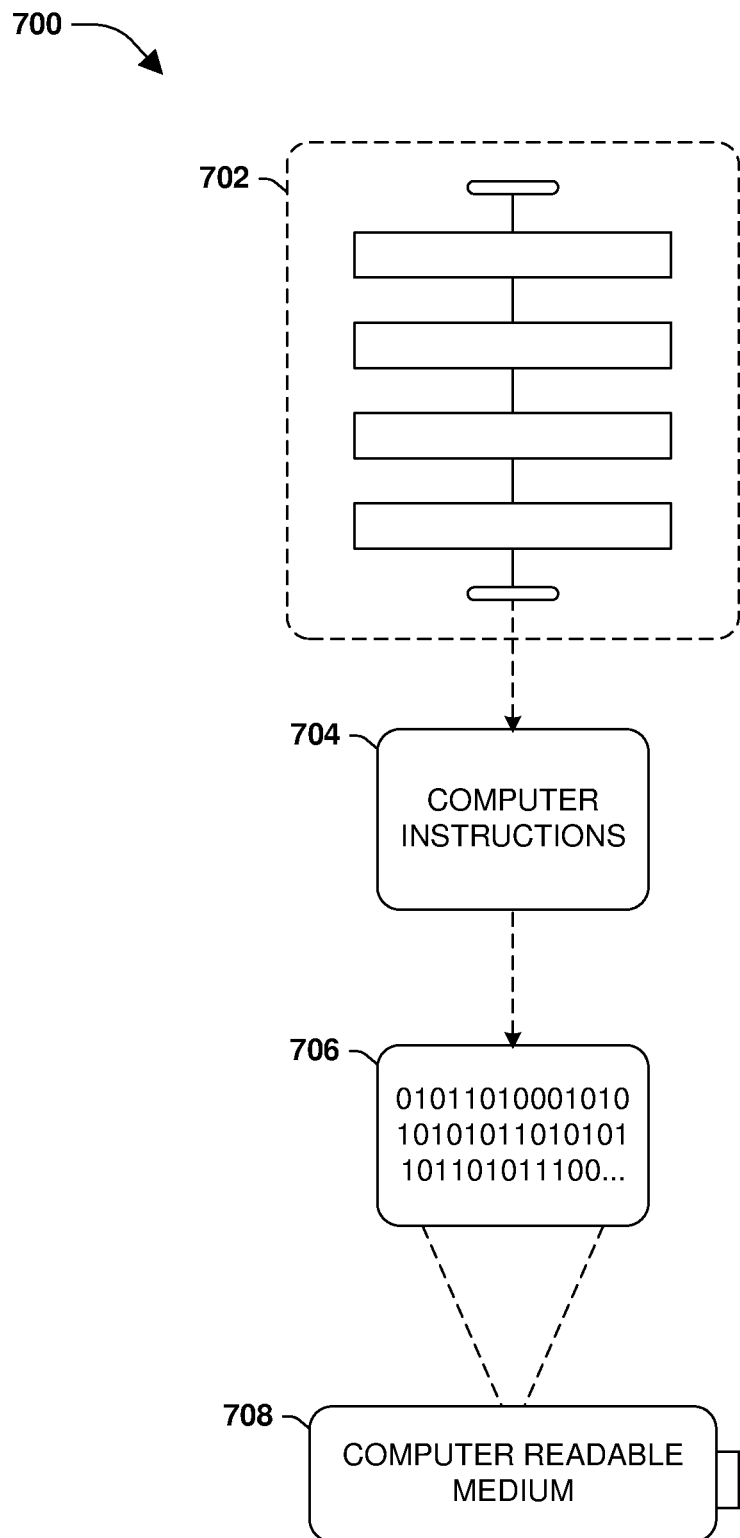
FIG. 7 is an example of a computer readable medium in which an embodiment of the invention may be implemented.

Still another embodiment involves a computer-readable medium 700 comprising processor-executable instructions configured to implement one or more of the techniques presented herein. An example embodiment of a computer-readable medium or a computer-readable device that is devised in these ways is illustrated in FIG. 7, wherein the implementation comprises a computer-readable medium 708, such as a compact disc-recordable (CD-R), a digital versatile disc-recordable (DVD-R), flash drive, a platter of a hard disk drive, etc., on which is encoded computer-readable data 706. This computer-readable data 706, such as binary data comprising at least one of a zero or a one, in turn comprises processor-executable computer instructions 704 configured to operate according to one or more of the principles set forth herein. In some embodiments, the processor-executable computer instructions 704 are configured to perform a method 702, such as at least some of the exemplary method 400 of FIG. 4, for example. In some embodiments, the processor-executable computer instructions 704 are configured to implement a system, such as at least some of the exemplary system 500 of FIGS. 5A-5C and/or at least some of the exemplary system 600 of FIGS. 6A-6D, for example. Many such computer-readable media are contemplated to operate in accordance with the techniques presented herein.

In an embodiment, the described methods and/or their equivalents may be implemented with computer executable instructions. Thus, in an embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on. In an embodiment, a computing device is implemented with one or more executable algorithms that are configured to perform any of the disclosed methods.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), electrically erasable programmable read-only memory (EEPROM) and/or flash memory, compact disk read only memory (CD-ROM)s, CD-Rs, compact disk re-writeable (CD-RW)s, DVDs, cassettes, magnetic tape, magnetic disk storage, optical or non-optical data storage devices and/or any other medium which can be used to store data.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A system, comprising:
a storage file system tier of a storage operating system storage stack, wherein the storage file system tier manages a storage file system that stores data within a storage device according to block-addressable access; and
a persistent memory storage tier of the storage operating system storage stack, wherein the persistent memory storage tier manages a persistent memory file system that stores data within a plurality of pages of persistent memory according to byte-addressable access, wherein the persistent memory storage tier and the storage file system tier facilitate communication between the persistent memory file system and the storage file system, and wherein the persistent memory file system:
persists data of a write operation to a page within the persistent memory, wherein the page is assigned a page block number of a per-page structure allocated for executing the write operation targeting a file;
generates a per-page structure identifier for the per-page structure; and
stores the per-page structure identifier and a generation count into a parent indirect page.

2. The system of claim 1, wherein the persistent memory file system:
persists the per-page structure to the persistent memory for locating and accessing the page rebased upon the page block number.

3. The system of claim 1, wherein the persistent memory file system:
inserts the per-page structure identifier into a file tree of the file.

4. The system of claim 1, wherein the persistent memory file system:
receives an operation to access the data within the persistent memory; and
utilizes the per-page structure to locate and access the data within the page assigned the page block number of the per-page structure.

5. The system of claim 1, wherein the persistent memory file system:
receives an operation to access the data within the persistent memory;
traverses a file tree of the file to identify the per-page structure identifier for the per-page structure; and
utilizes the per-page structure identifier to access the per-page structure for locating and accessing the data within the page assigned the page block number of the per-page structure.

6. The system of claim 1, wherein the persistent memory file system:
store a checksum into the per-page structure; and
utilizing the checksum to verify stored data within the page.

7. The system of claim 1, wherein the persistent memory file system:
generates a checksum for the data; and
stores the checksum and the page block number into the per-page structure.

8. The system of claim 1, comprising:
an indirection layer comprising per-page structures populated with page block numbers, wherein the per-page structures have per-page structure identifiers used by parent indirect pages of a file tree of the file to access the per-page structures for identifying the page block numbers.

9. The system of claim 1, comprising:
an indirection layer used to provide indirection between references to pages within the persistent memory and page block numbers of physical page locations of data of the pages.

10. The system of claim 1, wherein the persistent memory file system:
selects a number of pages within the persistent memory to use for accommodating an atomicity size specified by a protocol associated with the write operation.

11. The system of claim 1, wherein the persistent memory file system:
tracks a set of pages within the persistent memory using a log, wherein an entry within the log specifies a volume targeted by the write operation, the file targeted by the write operation, a file block number of the page.

12. A method comprising:
hosting a persistent memory storage tier and a storage file system tier within a storage operating system storage stack of a node,
wherein the persistent memory storage tier is configured to manage a persistent memory file system that stores data within a plurality of pages of persistent memory according to byte-addressable access,
wherein the storage file system tier is configured to manage a storage file system that stores data within a storage device according to block-addressable access, and
wherein the persistent memory storage tier and the storage file system tier facilitate communication between the persistent memory file system and the storage file system; and
persisting data of a write operation to a page within the persistent memory, wherein the page is assigned a page block number of a per-page structure allocated for executing the write operation targeting a file, wherein the persisting comprises:
selecting a number of pages within the persistent memory to use for accommodating an atomicity size specified by a protocol associated with the write operation.

13. The method of claim 12, comprising:
persisting the per-page structure to the persistent memory for locating and accessing the page rebased upon the page block number.

14. The method of claim 12, comprising:
generating per-page structure identifier for the per-page structure; and
inserting the per-page structure identifier into a file tree of the file.

15. The method of claim 12, comprising:
receiving an operation to access the data within the persistent memory; and
utilizing the per-page structure to locate and access the data within the page assigned the page block number of the per-page structure.

16. The method of claim 12, comprising:
receiving an operation to access the data within the persistent memory;
traversing a file tree of the file to identify a per-page structure identifier for the per-page structure; and utilizing the per-page structure identifier to access the per-page structure for locating and accessing the data within the page assigned the page block number of the per-page structure.

17. The method of claim 12, comprising:
generating a per-page structure identifier for the per-page structure; and
storing the per-page structure identifier and a generation count into a parent indirect page.

18. The method of claim 12, comprising:
generating a checksum for the data; and
storing the checksum and the page block number into the per-page structure.

19. The method of claim 12, comprising:
maintaining an indirection layer comprising per-page structures populated with page block numbers, wherein the per-page structures have per-page structure identifiers used by parent indirect pages of a file tree of the file to access the per-page structures for identifying the page block numbers.

20. A non-transitory machine readable medium comprising instructions for performing a method, which when executed by a machine, causes the machine to:
host a persistent memory storage tier and a storage file system tier within a storage operating system storage stack of a node,
wherein the persistent memory storage tier is configured to manage a persistent memory file system that stores data within a plurality of pages of persistent memory according to byte-addressable access,
wherein the storage file system tier is configured to manage a storage file system that stores data within a storage device according to block-addressable access, and
wherein the persistent memory storage tier and the storage file system tier facilitate communication between the persistent memory file system and the storage file system; and
persist data of a write operation to a page within the persistent memory, wherein the page is assigned a page block number of a per-page structure allocated for executing the write operation targeting a file;
generate a per-page structure identifier for the per-page structure; and
store the per-page structure identifier and a generation count into a parent indirect page.

21. The non-transitory machine readable medium of claim 20, wherein the instructions cause the machine to:
receive an operation to access the data within the persistent memory; and
utilize the per-page structure to locate and access the data within the page assigned the page block number of the per-page structure.

22. The non-transitory machine readable medium of claim 20, wherein the instructions cause the machine to:
receive an operation to access the data within the persistent memory;
traverse a file tree of the file to identify the per-page structure identifier for the per-page structure; and
utilize the per-page structure identifier to access the per-page structure for locating and accessing the data within the page assigned the page block number of the per-page structure.

23. A method, comprising:
hosting a persistent memory storage tier and a storage file system tier within a storage operating system storage stack of a node,
wherein the persistent memory storage tier is configured to manage a persistent memory file system that stores data within a plurality of pages of persistent memory according to byte-addressable access,
wherein the storage file system tier is configured to manage a storage file system that stores data within a storage device according to block-addressable access, and
wherein the persistent memory storage tier and the storage file system tier facilitate communication between the persistent memory file system and the storage file system; and
persisting data of a write operation to a page within the persistent memory, wherein the page is assigned a page block number of a per-page structure allocated for executing the write operation targeting a file;
generating a per-page structure identifier for the per-page structure; and
storing the per-page structure identifier and a generation count into a parent indirect page.

24. The method of claim 23, comprising:
receiving an operation to access the data within the persistent memory; and
utilizing the per-page structure to locate and access the data within the page assigned the page block number of the per-page structure.

25. The method of claim 23, comprising:
receiving an operation to access the data within the persistent memory;
traversing a file tree of the file to identify the per-page structure identifier for the per-page structure; and
utilizing the per-page structure identifier to access the per-page structure for locating and accessing the data within the page assigned the page block number of the per-page structure.

26. A non-transitory machine readable medium comprising instructions for performing a method, which when executed by a machine, causes the machine to:
host a persistent memory storage tier and a storage file system tier within a storage operating system storage stack of a node,
wherein the persistent memory storage tier is configured to manage a persistent memory file system that stores data within a plurality of pages of persistent memory according to byte-addressable access,
wherein the storage file system tier is configured to manage a storage file system that stores data within a storage device according to block-addressable access, and
wherein the persistent memory storage tier and the storage file system tier facilitate communication between the persistent memory file system and the storage file system; and
persist data of a write operation to a page within the persistent memory, wherein the page is assigned a page block number of a per-page structure allocated for executing the write operation targeting a file by:
selecting a number of pages within the persistent memory to use for accommodating an atomicity size specified by a protocol associated with the write operation.

27. The non-transitory machine readable medium of claim 26, wherein the instructions cause the machine to:
receive an operation to access the data within the persistent memory; and utilize the per-page structure to locate and access the data within the page assigned the page block number of the per-page structure.

28. The non-transitory machine readable medium of claim 26, wherein the instructions cause the machine to:
receive an operation to access the data within the persistent memory;
traverse a file tree of the file to identify a per-page structure identifier for the per-page structure; and
utilize the per-page structure identifier to access the per-page structure for locating and accessing the data within the page assigned the page block number of the per-page structure.

29. A system, comprising:
a storage file system tier of a storage operating system storage stack, wherein the storage file system tier manages a storage file system that stores data within a storage device according to block-addressable access; and
a persistent memory storage tier of the storage operating system storage stack, wherein the persistent memory storage tier manages a persistent memory file system that stores data within a plurality of pages of persistent memory according to byte-addressable access, wherein the persistent memory storage tier and the storage file system tier facilitate communication between the persistent memory file system and the storage file system, and wherein the persistent memory file system:
persists data of a write operation to a page within the persistent memory, wherein the page is assigned a page block number of a per-page structure allocated for executing the write operation targeting a file by:
selecting a number of pages within the persistent memory to use for accommodating an atomicity size specified by a protocol associated with the write operation.

30. The system of claim 29, wherein the persistent memory file system:
receives an operation to access the data within the persistent memory; and
utilizes the per-page structure to locate and access the data within the page assigned the page block number of the per-page structure.

31. The system of claim 29, wherein the persistent memory file system:
receives an operation to access the data within the persistent memory;
traverses a file tree of the file to identify a per-page structure identifier for the per-page structure; and
utilizes the per-page structure identifier to access the per-page structure for locating and accessing the data within the page assigned the page block number of the per-page structure.

* * * * *